United States Patent [19]

Van Kamp et al.

[11] 3,759,960

[45] Sept. 18, 1973

[54] NOVEL 16-METHYLENE-9β, 10α-STEROID COMPOUNDS, PHARMACEUTICAL PREPARATIONS WHICH CONTAIN THE NOVEL COMPOUNDS AS ACTIVE INGREDIENTS, AND METHODS OF PRODUCING THE SAID COMPOUNDS AND PREPARATIONS

[75] Inventors: Harmen Van Kamp; Anna Maria DeWachter, both of Weesp, Netherlands

[73] Assignee: U.S. Philips Corporation, New York, N.Y.

[22] Filed: Mar. 3, 1971

[21] Appl. No.: 120,720

[30] Foreign Application Priority Data
Mar. 4, 1970 Netherlands ...................... 7003061

[52] U.S. Cl....... 260/397.4, 260/397.47, 260/397.5, 260/239.55, 260/239.5, 424/243
[51] Int. Cl. .......................................... C07c 169/66
[58] Field of Search.................... 260/397.4, 397.47, 260/397.5

[56] References Cited
UNITED STATES PATENTS
3,493,588  2/1970  Herzog et al. .................... 260/397.4
3,449,495  6/1969  Bruckner et al. ................. 260/397.4

Primary Examiner—Elbert L. Roberts
Attorney—Frank R. Trifari

[57] ABSTRACT

The invention relates to novel 16-methylene-17α-acyloxy (or etherified hydroxy)-9β, 10α-steroid compounds of the pregnane series which have an exceptionally high endocrinological activity, such as a very strong progestational and anti-ovulatory activity. After the compounds have been worked up into pharmaceutical preparations they may be used inter alia as contraceptives or for maintaining pregnancy. Highly active substances according to the invention are, for example, 6-chloro-16-methylene-17α-hydroxy-9β, 10α-pregna-4,6-diene-3,20-dione 17-acetate and 6-fluoro-16-methylene-17α-hydroxy-9β, 10α-pregna-4,6-diene-3,20-dione 17-acetate.

19 Claims, No Drawings

NOVEL 16-METHYLENE-9β, 10α-STEROID COMPOUNDS, PHARMACEUTICAL PREPARATIONS WHICH CONTAIN THE NOVEL COMPOUNDS AS ACTIVE INGREDIENTS, AND METHODS OF PRODUCING THE SAID COMPOUNDS AND PREPARATIONS

From the U.S. Pat. No. 3,198,792 it is known that steroids of the retro-series, which in contrast with the steroids of the normal series have a 9 β, 10α-configuration, exhibit interesting endocrinological properties. In columns 11 to 23 of the said patent about 800 substances or groups of substances have been listed as examples of retro-steroids.

It has now been found that novel 9 β, 10α steroids which correspond to the general formula:

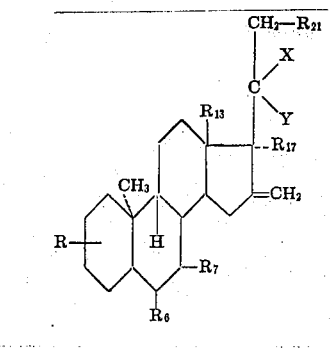

where

R is a 3-keto-4-dehydro, 1,2-methylene-3-keto-dehydro, 3-keto-1,4-bisdehydro, 3-keto-4,6-bisdehydro, 1,2-methylene-3-keto-4,6-bisdehydro, 3-keto-1,4,6-trisdehydro, 3-OR-4,6-bisdehydro, 1,2-methylene-3-OR-4,6-bisdehydro, 3-OR-3,5-bisdehydro, 1,2-methylene-3-OR-3,5-bisdehydro or 3-OR'-1,4,6-trisdehydro group, where OR represents an etherified or esterified hydroxy group and OR' represents an esterified hydroxy group, $R_6$ is a hydrogen atom, a chlorine atom, a fluorine atom, a 6,6-difluoro group, a 6,6-dichloro group or a methyl group, whilst if $R_6$ is a hydrogen atom, $R_7$ is a 6,7-methylene group, $R_7$ is a hydrogen atom or a 6,7-methylene group, whilst, if $R_7$ is a 6,7-methylene group, $R_6$ represents a hydrogen atom, a chlorine atom or a fluorine atom and also $R_3$ is a 3-keto-4-dehydro or a 3-keto-1,4-bisdehydro group, $R_{17}$ is an etherified hydroxy group containing from one to five carbon atoms or an esterified hydroxy group containing from one to seven carbon atoms, $R_{21}$ is a hydrogen atom, a fluorine atom, a hydroxy group or an esterified hydroxy group, $R_{13}$ is a methyl or ethyl group, and X and Y either together represent a double-bonded oxygen atom or X is a hydrogen atom and Y is a hydroxy or esterified hydroxy group, have an extraordinarily high endocrinological activity.

The endocrinological activity and in particular the progestational and anti-ovulatory activity of the above-mentioned group of compounds according to the invention are much stronger than those of the compounds listed in columns 11 to 23 of the above-mentioned specification. It has further been found that the progestational and anti-ovulatory activities of the substances according to the invention are many times stronger than those of the isomeric compounds of the normal series.

More particularly it has been found that the compounds which correspond to the general formula:

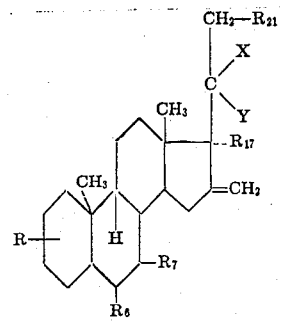

where R, $R_6$, $R_7$, $R_{17}$, $R_{21}$, X and Y have the above-mentioned meanings, have surprisingly high progestational and anti-ovulatory activities both in the case of oral administration and in that of parenteral administration. This applies in particular to a compound of the formula:

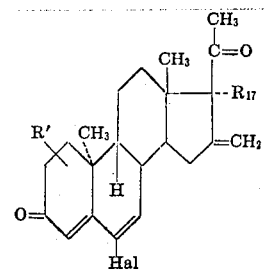

where R' is a hydrogen atom or a 1,2-methylene group, Hal represents a chlorine or fluorine atom and $R_{17}$ has the above-mentioned meaning.

Examples of outstandingly active compounds the oral and parenteral progestational and anti-ovulatory activities of which are considerably higher than those of the most potent progestational and anti-ovulatory compounds known hitherto, are:

6-fluoro-16-methylene-17α-hydroxy-9β, 10α-pregna-4,6-diene-3,20-dione 17-acetate,
6-fluoro-16-methylene-17α-hydroxy-9β, 10α-pregna-4,6-diene-3,20-dione 17-propionate,
6-chloro-16-methylene-17α-hydroxy-9β, 10α-pregna-4,6-diene-3,20-dione 17-acetate,
6-chloro-16-methylene-17α-hydroxy-9β, 10α-pregna 4,6-diene-3,20-dione 17-propionate,
1,2;16-bismethylene-6-fluoro-17α-hydroxy-9β, 10α-pregna-4,6-diene-3,20-dione 17-acetate,
1,2; 16-bismethylene-6-chloro-17α-hydroxy-9β, 10α-pregna-4,6-diene-3,20-dione 17-acetate
1,2; 16-bismethylene-6-fluoro-17α-hydroxy-9β, 10α-pregna-4,6-diene-3,20-dione 17-propionate,
1,2; 16-bismethylene-6-chloro-17α-hydroxy-9β, 10α-pregna-4,6-diene-3,20-dione 17-propionate.

A greatly prolonged progestational and anti-ovulatory activity has been found in compounds of the formula:

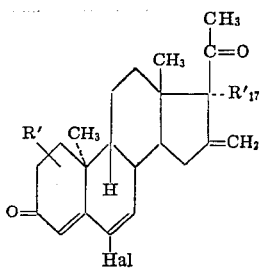

where R' is a hydrogen atom or a 1,2-methylene group, Hal is a fluorine or chlorine atom and $R_{17}'$ is an etherified hydroxy group containing from one to five carbon atoms or an esterified hydroxy group containing from four to eight carbon atoms.

Examples of prolonged-activity compounds are
6-chloro-16-methylene-17α-hydroxy-9β10α-pregna-4,6-diene-3,20-dione 17-caproate,
6-fluoro-16-methylene-17α-hydroxy-9β, 10α-pregna-4,6-diene-3,20-dione 17-caproate,
6-fluoro-16-methylene-17α-methoxy-9β, 10α-pregna-4,6-diene-3,20-dione,
6-chloro-16-methylene-17α-methoxy-9β, 10α-pregna-4,6-diene-3,20-dione,
1,2; 16-bismethylene-6-fluoro-17α-methoxy-9β, 10α-pregna-4,6-diene-3,20-dione,
1,2; 16-bismethylene-6-chloro-17α-methoxy-9β, 10α-pregna-4,6-diene-3,20-dione,
1,2; 16-bismethylene-6-chloro-17α-hydroxy-9β, 10α-pregna-4,6-diene-3,20-dione 17-caproate,
1,2; 16-bismethylene-6-fluoro-17α-hydroxy-9β, 10α-pregna-4,6-diene-3,20-dione 17-caproate.

In addition to the above-mentioned specific compounds according to the invention the following substances may be mentioned as examples of active substances according to the invention:
3-ethoxy-6-chloro-16-methylene-17α-hydroxy-9 β10α-pregna-3,5-diene-20-one 17-acetate,
6-chloro-16-methylene-17α-hydroxy-9β, 10α-pregna-1,4,6-triene-3,20-dione 17-acetate,
3-ethoxy-6-fluoro-16-methylene-17α-hydroxy-9β, 10α-pregna-3,5-diene-20-one 17-acetate,
6-methyl-16-methylene-17α-hydroxy-9β, 10α-pregna-4,6-diene-3,20-dione 17-acetate,
6-chloro-16-methylene-17α, 20β-dihydroxy-9β, 10α-pregna-4,6-diene-3-one 17-acetate,
6-fluoro-16-methylene-17α, 20β-dihydroxy-9β, 10α-pregna-4,6-diene-3-one 17-acetate,
6-chloro-16-methylene-17α20β-dihydroxy-9β, 10α-pregna-4,6-diene-3-one 17,20-diacetate,
6-fluoro-16-methylene-17α, 20β-dihydroxy-9β, 10α-pregna-4,6-diene-3-one 17,20-diacetate,
3,17α, 20β-trihydroxy-6-fluoro-16-methylene-9β, 10α-pregna-4,6-diene 3, 17, 20-triacetate,
3, 17α,20β-trihydroxy-6-chloro-16-methylene-9β,10α-pregna-4,6-diene-3,17,20-triacetate,
6-fluoro-16-methylene-17α-hydroxy-21-fluoro-9β,10α-pregna-4,6-diene-3,20-dione 17-acetate,
3, 17α-dihydroxy-6-fluoro-16-methylene-9β, 10α-pregna-2,4,6-triene-20-one 3,17-diacetate,
3, 17α-dihydroxy-6-chloro-16-methylene-9β, 10α-pregna-2,4,6-triene-20-one 3,17-diacetate,
6-fluoro-16-methylene-17α-hydroxy-9β, 10α-pregna-1,4,6-triene-3,20-dione 17-acetate,
6-chloro-3α17α-dihydroxy-16-methylene-9β, 10α-pregna-4,6-diene-20-one 17-acetate,
6-chloro-3α, 17α-dihydroxy-16-methylene-9β, 10α-pregna-4,6-diene-20-one 3, 17-diacetate,
6-fluoro-3α, 17α-dihydroxy-16-methylene-9β, 10α-pregna-4,6-diene-20-one 17-acetate,
6-fluoro-3α, 17α-dihydroxy-16-methylene-9β, 10α-pregna-4,6-diene-20-one 3, 17-diacetate,
3-ethoxy-6-fluoro-17α-hydroxy-1,2; 16-bismethylene-9β, 10α-pregna-3,6-diene-20-one 17-acetate,
3-ethoxy-6-chloro-17α-hydroxy-1,2; 16-bismethylene-9β, 10α-pregna-3,5-diene-20-one 17-acetate,
6α-chloro-17α-hydroxy-1,2;6,7; 16-trismethylene-9β, 10α-pregn -4-ene-3,20-dione 17-acetate,
6α-fluoro-17α-hydroxy-1,2;6,7; 16-trismethylene-9β, 10α-pregn-4-ene-3,20-dione 17-acetate,
6-methyl-17α-hydroxy-1,2; 16-bismethylene-9β, 10α-pregna-4,6-diene-3,20-dione 17-acetate.

Other interesting compounds according to the invention are:
6-chloro-16-methylene-17α-ethoxy-9β, 10α-pregna-4,6-diene-3,20-dione,
6-fluoro-16-methylene-17α-ethoxy-9β, 10α-pregna-4,6-diene-3,20-dione,
6-chloro-16-methylene-17α-tetrahydropyranyloxy-9β, 10α-pregna-4,6-diene-3,20-dione,
6-fluoro-16-methylene-17α-tetrahydropyranyloxy-9β, 10α-pregna-4,6-diene-3,20-dione,
6-fluoro-6,7; 16-bismethylene-17α-hydroxy-9β, 10α-pregn-4-ene-3,20-dione 17-acetate,
6-chloro-6,7;16-bismethylene-17αhydroxy-9 09,10α-pregn-4-ene-3,20-dione 17-acetate,
6-fluoro-16-methylene-17α-hydroxy-9β, 10α-pregn-4-ene-3,20-dione 17-acetate,
6-chloro-16-methylene-17α-hydroxy-9β, 10α-pregn-4-ene-3,20-dione 17-acetate,
6,6-dichloro-16-methylene-17α-hydroxy-9β, 10α-pregn-4-ene-3,20-dione 17-acetate,
6,6-difluoro-16-methylene-17α-hydroxy-9β, 10α-pregn-16-ene-3,20-dione 17-acetate,
6-chloro-16-methylene-17α, 21-dihydroxy-9β10α-pregna-4,6-diene-3,20-dione 17,21-diacetate,
6-fluoro-16-methylene-17α21-dihydroxy-9β, 10α-pregna-4,6-diene-3,20-dione 17,21-diacetate,
6-chloro-16-methylene-17α-hydroxy-18-methyl-9β, 10α-pregna-4,6-diene-3,20-dione 17-acetate,
6-fluoro-16-methylene-17α-hydroxy-18-methyl-9β, 10α-pregna-4,6-diene-3,20-dione 17-acetate,
6-chloro-16-methylene-17α-hydroxy-18-methyl-9β, 10α-pregna-4,6-diene-3,20-dione 17-propionate,
6-fluoro-16-methylene-17α-hydroxy-18-methyl-9β, 10α-pregna-4,6-diene-3,20-dione 17-propionate,
6-fluoro-17α-hydroxy-1,2; 16-bismethylene-9β, 10α-pregn-4-ene-3,20-dione 17-acetate,
6-chloro-17α-hydroxy-1,2; 16-bismethylene-9β, 10α-pregn-4-ene-3,20-dione 17-acetate,
6,6-difluoro-17α-hydroxy-1,2; 16-bismethylene-9β, 10α-pregn-4-ene-3,20-dione 17-acetate,
6,6-dichloro-17α-hydroxy-1,2; 16-bismethylene-9β, 10α-pregn-4-ene-3,20-dione 17-acetate,
6-fluoro-17α-ethoxy-1,2; 16-bismethylene-9β, 10α-pregna-4,6-diene-3,20-dione,
6-chloro-17α-ethoxy-1,2; 16-bismethylene-9β, 10α-pregna-4,6-diene-3,20-dione, 6-chloro-17α-hydroxy-1,2;
16-bismethylene-18methyl-9β,
10α-pregna-4,6-diene-3,20-dione 17-acetate,
6-fluoro-17α-hydroxy-1,2;
16-bismethylene-18-methyl-9β,
10α-pregna-4,6-diene-3,20-dione 17-acetate,
6-fluoro-17α-hydroxy-1,2;
16-bismethylene-18-methyl-9β,
10α-pregna-4,6-diene-3,20-dione 17-propionate,
6-chloro-17α-hydroxy-1,2;
16-bismethylene-18-methyl-9β,
10α-pregna-4,6-diene-3,20-dione 17 propionate,
6-chloro-17α-methoxy-1,2; 16-bismethylene-18-methyl-9β, 10α-pregna-4,6-diene-3,20-dione,
6-fluoro-17α-methoxy-1,2;
16-bismethylene-18-methyl-9β,
10α-pregna-4,6-diene-3,20-dione,
6-fluoro-17α-methoxy-16-methylene-18-methyl-9β10α-pregna-4,6-diene-3,20-dione,
6-chloro-17α-methoxy-16-methylene-18-methyl-9β, 10α-pregna-4,6-diene-3,20-dione,
6-chloro-16-methylene-17α-hydroxy-18-methyl-9β10α-pregna-4,6-diene-3,20-dione 17-caproate,
6-fluoro-16-methylene-17α-hydroxy-18-methyl-9β10α-pregna-4,6-diene-3,20-dione 17-caproate,
6-chloro-1,2;
16-bismethylene-17α-hydroxy-18-methyl-9β,
10α-pregna-4,6-diene-3,20-dione 17-caproate,
6-fluoro-1,2; 16-bismethylene-17α-hydroxy-18-methyl-9β, 10α-pregna-4,6-diene-3,20-dione 17-caproate.

When the substituent R or $R_{21}$ contains or represents an esterified hydroxy group this group contains from one to 20 carbon atoms and is preferably derived from a saturated or unsaturated aliphatic mono-, di- or tricarboxylic acid, an aclicyclic carboxylic acid, a mixed aliphatic-alicyclic carboxylic acid, an aliphatic aromatic carboxylic acid or an aromatic carboxylic acid. Examples of esterified hydroxy groups are hydroxy groups esterified with formic acid, acetic acid, propionic acid, butyric acid, decane-carboxylic acid, cyclohexyl-propionic acid, phenylpropionic acid, phenylacetic acid, phenyloxy-phenylpropionic acid, enanthoylacetic acid, oleic acid palmitic acid, stearic acid, enanthoic acid, caproic acid, pivoalic acid, succinic acid, malonic acid, benzoic acid, citric acid, p-hexyloxyphenylpropionic acid, hexahydrobenzoic acid, β-cyclopentylpropionic acid and β-cyclohexylpropionic acid.

If $R_{17}$ represents an esterified hydroxy group, this group has been derived from a carboxylic acid of the aforementioned kind, however, on the understanding that the acid should contain at most 8 carbon atoms. Examples of suitable carboxylic acids are acetic acid, propionic acid and caproic acid.

If R contains an etherified hydroxy group, this group has preferably been derived from an aliphatic, mixed aliphatic-aromatic or mixed aliphatic-alicyclic alcohol. Examples of etherified hydroxy groups are: methoxy, ethoxy, tert.butoxy, cyclohexyloxy, benzyloxy, tetrahydrofuranyloxy and tetrahydropyranyloxy.

If $R_{17}$ represents an etherified hydroxy group, this has been derived from an alcohol of the aforementioned kind, however, the alcohol should contain at most five carbon atoms. Suitable etherified hydroxy groups are methoxy, ethoxy, propoxy and tetrahydropyranyloxy.

If the compounds according to the invention contain a 1,2-methylene group, this group is in the β-position.

The compounds according to the invention are novel substances which may be prepared by methods which are known as such for synthesizing similar compounds or by analogous methods.

Thus, the compounds according to the invention may be produced by a. treating a compound of the formula:

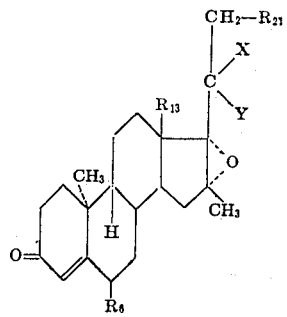

where $R_6$ represents a fluorine atom, a chlorine atom, a 6,6-dichloro group, a 6,6-difluoro group or a methyl group, and X, Y, $R_{13}$ and $R_{21}$ have the aforementioned meanings, with an acylating agent in the presence of a catalyst so as to produce a compound of the formula:

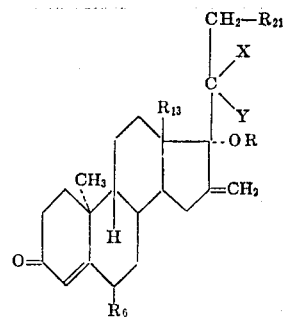

where $R_6$ and $R_{13}$ have the aforementioned meansings, meanings, is an esterified hydroxy group containing from one to eight carbon atoms, $R_{21}$ is a hydrogen atom, a fluorine atom or an esterified hydroxy group, X and Y either together represent a double-bonded oxygen atom or X is a hydrogen atom and Y is an esterified hydroxy group, b. treating a compound of the formula

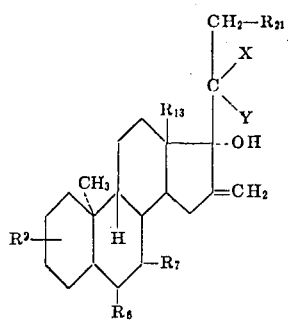

where $R_6$, $R_7$, $R_{13}$, $R_{21}$, X and Y have the aforementioned meanings, and $R_2$ is a 3-keto-4-dehydro, 1,2-methylene-3-keto-4-dehydro, 3-keto-1,4-bisdehydro, 1,2-methylene-3- keto-4,6-bisdehydro, 3-keto-4,6-bisdehydro or 3-keto-1,4,6-trisdehydro group,
with an acylating or alkylating agent so as to produce a compound of the formula:

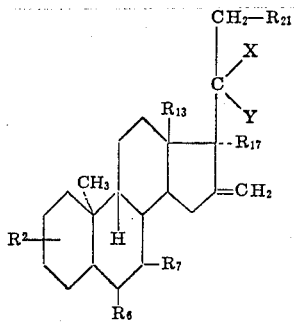

where $R^2$, $R_6$, $R_7$ and $R_{13}$ have the afore-mentioned meanings, X and Y either together represent a double-bonded oxygen atom or X is a hydrogen atom and Y is an esterified hydroxy group, $R_{21}$ is a hydrogen atom, a fluorine atom or an esterified hydroxy group, and $R_{17}$ has the aforementioned meaning, c. subjecting a compound of the formula

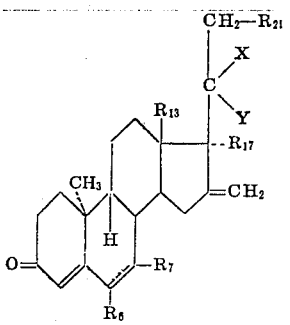

where $R_6$, $R_7$, $R_{13}$, $R_{17}$, $R_{21}$, X and Y have the aforementioned meanings, whilst a 6,7-double bond may be present, to a 1,2-dehydrogenation reaction, in which a double bond is introduced between the carbon atoms one and two;

d. subjecting a compound of the formula:

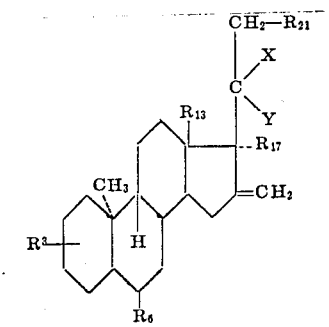

where X, Y, $R_{13}$, $R_{17}$ and $R_{21}$ have the aforementioned meanings, $R_6$ is a chlorine atom, a fluorine atom or a methyl group, and $R^3$ is a 3-Keto-4-dehydro, a 1,2-methylene-3-keto-4-dehydro, a 3-OR-3,5-bisdehydro- or a 1,2-methylene-3-OR-3,5-bisdehydro group, OR being an etherified or esterified hydroxy group, to a 6,7-dehydrogenation reaction so as to produce a compound of the formula:

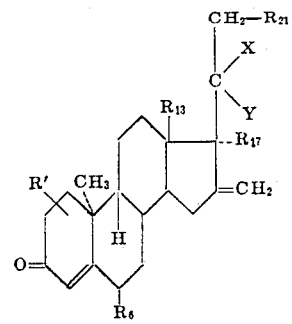

where X, Y, $R_6$, $R_{13}$, $R_{17}$ and $R_{21}$ have the aforementioned meanings and
R' is a hydrogen atom or a 1,2-methylene group;

e. subjecting a compound of the formula:

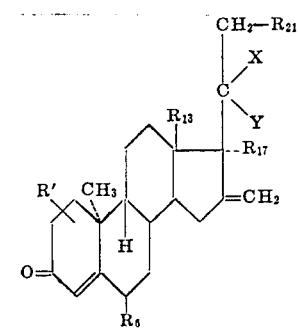

where $R_6$ is a chlorine atom, a fluorine atom or a methyl group and R', X, Y, $R_{13}$, $R_{17}$ and $R_{21}$ have the aforementioned meanings, to an enolesterification or enoletherification reaction so as to form a compound of the formula

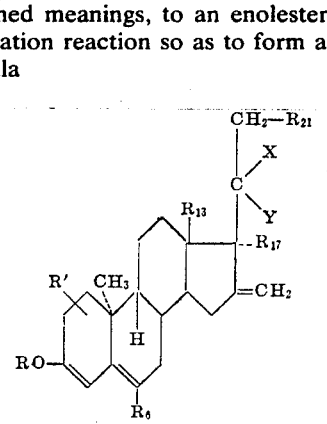

where R', $R_6$, $R_{13}$, $R_{17}$, $R_{21}$, X and Y have the aforementioned meanings and
OR is an etherified or esterified hydro group;

f. treating a compound of the formula

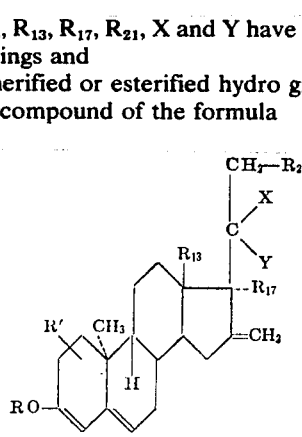

where R', X, Y, $R_{13}$, $R_{17}$ and $R_{21}$ have the aforementioned meanings and OR is an etherified or esterified hydroxy group, with a chlorinating or fluorinating agent so as to form a compound of the formula:

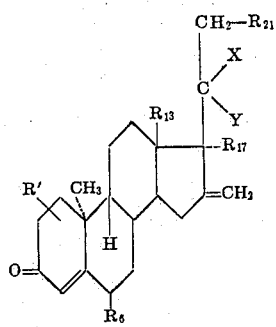

where R', X, Y, $R_{13}$, $R_{17}$ and $R_{21}$ have the aforementioned meanings and $R_6$ represents a chlorine or fluorine atom;

g. subjecting a compound of the formula

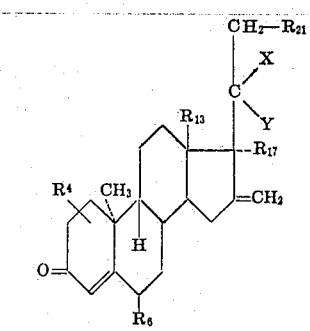

where X, Y, $R_{13}$, $R_{17}$ and $R_{21}$ have the aforementioned meanings, except for the combination $R_{21}$ and/or $R_{17}$ is/are an esterified hydroxy group and X and Y together are a double-bonded oxygen atom, $R_6$ is a hydrogen atom, a chlorine atom or a fluorine atom, and $R^4$ is a hydrogen atom, a 1,2-methylene group or a 1,2-dehydro bond, to a methylenating reaction so as to form a compound of the formula:

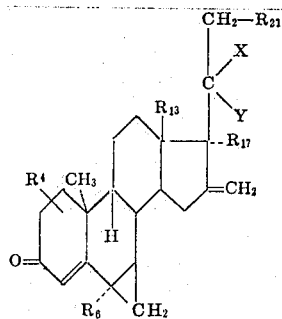

where $R^4$, X, Y, $R_6$, $R_{13}$, $R_{17}$ and $R_{21}$ have the aforementiond meanings;

h. subjecting a compound of the formula:

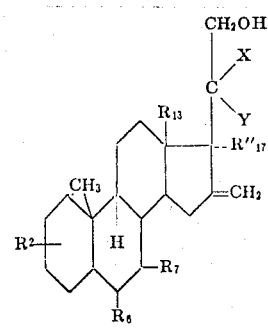

where $R^2$, $R_6$, $R_7$ and $R_{13}$ have the aforementioned meanings, X and Y either together represents a double-bonded oxygen atom or X is a hydrogen atom and Y is a hydroxy group, and $R''_{17}$ is a hydroxy group or an etherified hydroxy group containing from one to five carbon atoms or an esterified hydroxy group containing from one to eight carbon atoms, to an esterification reaction so as to form a compound of the formula:

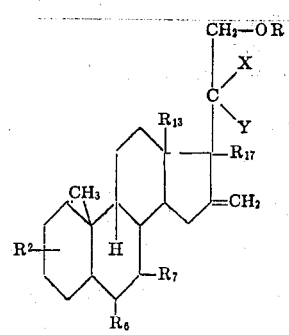

where $R^2$, $R_6$, $R_7$ and $R_{13}$ have the aforementioned meanings, $R_{17}$ has the aforementioned meaning, X and Y either together represent a double-bonded oxygen atom or X is a hydrogen atom and Y is an esterified hydroxy group, and OR represents an esterified hydroxy group;

i. treating a compound of the formula:

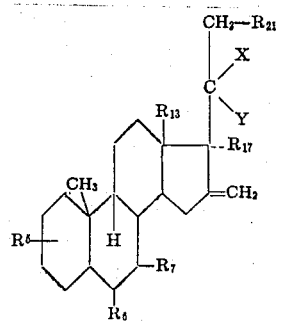

where $R_6$, $R_7$, $R_{13}$ and $R_{17}$ have the aforementioned meanings, $R^5$ is a 3-keto-4-dehydro, a 1,2-methylene-3-ketodehydro, a 3-keto-1,4-bisdehydro, a 3-keto-4,6-bisdehydro, a 3-OH-4,6-bisdehydro, a 1,2-methylene-3-OH-4,6-bisdehydro or a 1,2-methylene-3-keto-4,6-bisdehydro group, and $R_{21}$ is a hydrogen atom, a fluorine atom or a hydroxy group, with an acylating agent so as to form a compound of the formula:

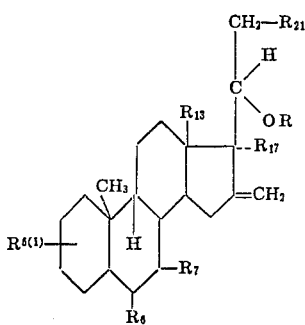

where $R_6$, $R_7$, $R_{13}$ and $R_{17}$ have the aforementioned meanings, $R^{5(1)}$ is a 3-keto-4-dehydro, a 1,2-methylene-3-keto-4-dehydro, a 3-keto-1,4-bisdehydro, a 3-keto-4,6-bisdehydro, a 1,2-methylene-3-keto-4,6-bisdehydro, a 3-OR-4,6-bisdehydro or a 1,2-methylene-3-OR-4,6-bisdehydro group, OR being an acyloxy group, $R_{21}$ is a hydrogen atom, a fluorine atom or an esterified hydroxy group and OR represents an acyloxy group;

k. treating a compound of the formula:

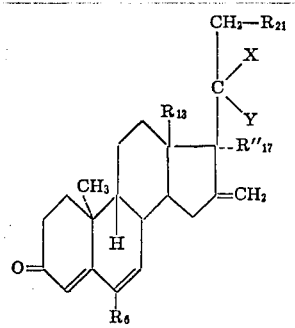

where $R_{13}$, $R_{21}$, X and Y have the aforementioned meanings, $R''_{17}$ is a hydroxy group, an etherified hydroxy group containing from one to five carbon atoms or an esterified hydroxy group containing from one to eight carbon atoms, and $R_6$ represents a chlorine atom, a fluorine atom or a methyl group, with a compound of the formula: AcCl, where Ac is an acyl group, in a reaction medium which contains, in addition to a compound of th formula $Ac_2O$, where Ac has the aforementioned meaning, an organic base, so as to produce a compound of the formula:

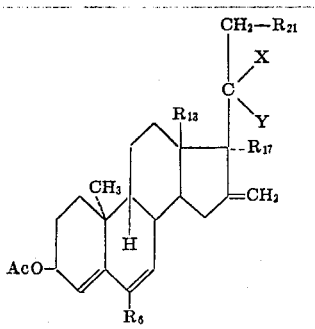

where $R_6$ and $R_{13}$ have the aforementioned meanings, $R_{17}$ has the aforementioned meaning, X and Y either together represent a double-bonded oxygen atom or X is a hydrogen atom and Y is an esterified hydroxy group, $R_{21}$ is a hydrogen atom, a fluorine atom or an esterified hydroxy, and OAc represents an acyloxy group;

l. treating a compound of the formula

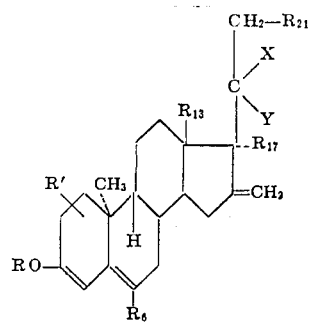

R', X, Y, $R_{13}$, $R_{17}$ and $R_{21}$ have the aforementioned meanings, $R_6$ is a fluorine atom or a chlorine atom and OR represents an etherified hydroxy group, with a chlorinating agent if $R_6$ is a chlorine atom or with perchlorylfluoride if $R_6$ is a fluorine atome, so as to form a compound of the formula:

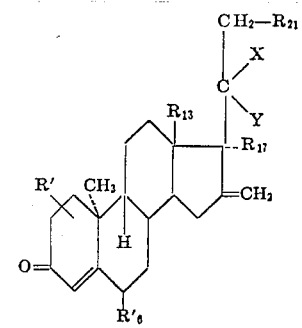

where R', X, Y, $R_{13}$, $R_{17}$ and $R_{21}$ have the aforementioned meanings and $R'_6$ is a 6,6-dichloro or a 6,6-difluoro group;

m. subjecting a compound of the formula:

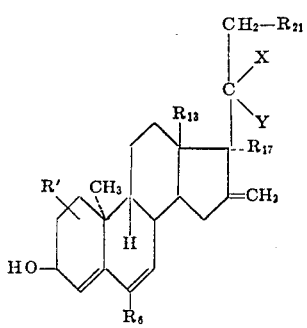

where R', $R_{13}$, $R_{17}$, $R_{21}$, X and Y have the aforementioned meanings and $R_6$ is a chlorine atome, a fluorine atom or a methyl group, to an etherification or an esterification so as to produce a compound of the formula:

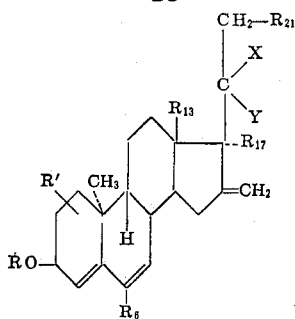

where R', $R_6$, $R_{13}$, $R_{21}$, X and Y have the aforementioned meanings and OR represents an etherified or esterified hydroxy group;

n. treating a compound of the formula:

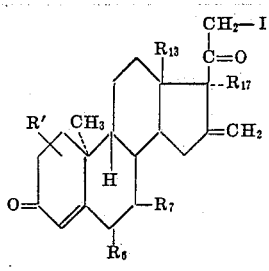

where R', $R_7$, $R_{13}$ and $R_{17}$ have the aforementioned meanings and $R_6$ is a hydrogen atom, a fluorine atom or a methyl group, with AgF in a solvent so as to form a compound of the formula:

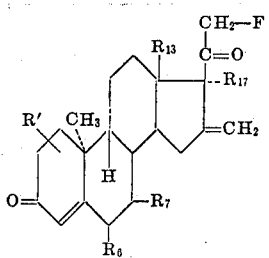

where R', $R_6$, $R_7$, $R_{13}$ and $R_{17}$ have the aforementioned meanings;

o. subjecting a compound of the formula:

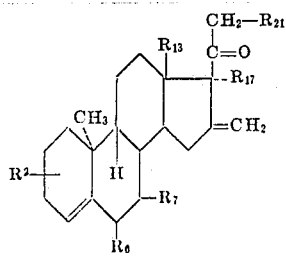

where $R^2$, $R_6$, $R_7$, $R_{13}$ and $R_{21}$ have the aforementioned meanings, to a reduction reaction so as to form a compound of the formula:

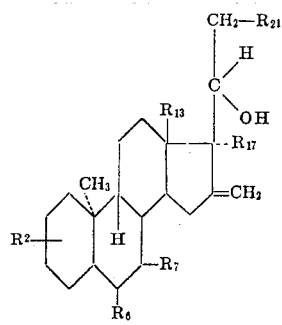

where $R^2$, $R_6$, $R_7$, $R_{13}$, $R_{17}$ and $R_{21}$ have the aforementioned meanings;

p. treating a compound of the formula:

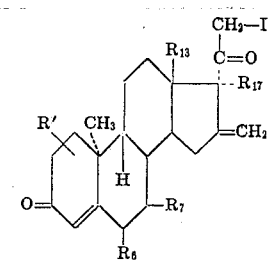

where R', $R_{13}$ and $R_{17}$ have the aforementioned meanings and $R_6$ is a hydrogen atom, a methyl group or a fluorine atom, with triethylamine acetic acid and then with an alkali metal acetate, so as to produce a compound of the formula:

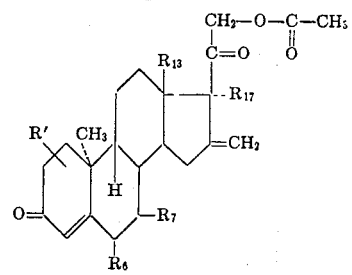

where R', $R_6$, $R_7$, $R_{13}$ and $R_{17}$ have the aforementioned meanings;

q. hydrolysing a compound of the formula:

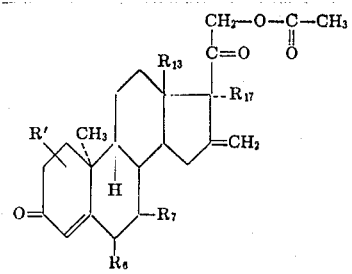

where R', $R_7$, $R_{13}$ and $R_{17}$ have the aforementioned meanings and $R_6$ is a hydrogen atom, a fluorine atom or a methyl group, so as to produce a compound of the formula:

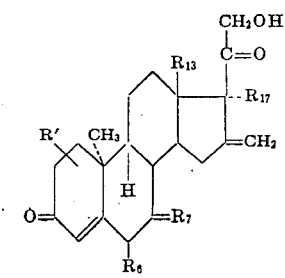

where R', $R_6$, $R_7$, $R_{13}$ and $R_{17}$ have the aforementioned meanings;

r. treating a compound of the formula:

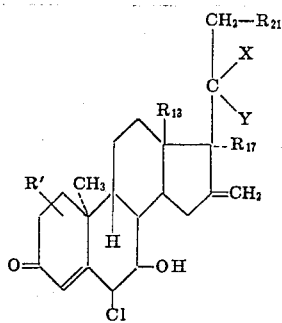

where R', $R_{13}$ and $R_{17}$ have the aforementioned meanings, X and Y either together represent a double-bonded oxygen atom or X is a hydrogen atom and Y is an esterified hydroxy group, and $R_{21}$ is a hydrogen atom, a fluorine atom or an esterified hydroxy group, with a dehydrating agent so as to produce a compound of the formula:

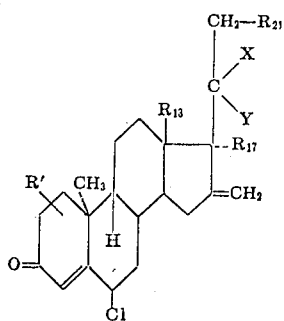

where R', $R_{13}$, $R_{17}$, $R_{21}$, X and Y have the aforementioned meanings;

s. catalytically hydrogenating a compound of the formula

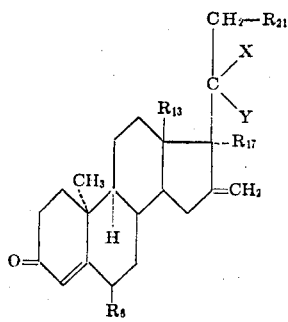

where $R_{13}$, $R_{17}$, $R_{21}$, X and Y have the aforementioned meanings and $R_6$ is a chlorine atom, a fluorine atom or a methyl group, so as to produce a compound of the formula:

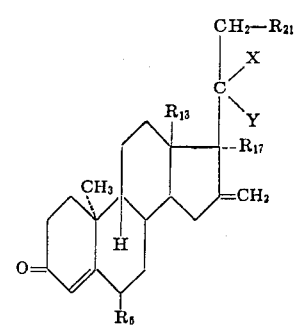

where $R_6$, $R_{13}$, $R_{17}$, $R_{21}$, X and Y have the aforementioned meanings;

t. isomerising a compound of the formula:

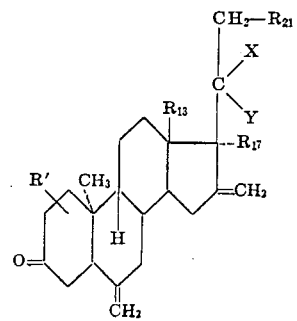

where R', $R_{13}$, $R_{17}$, X and Y have the aforementioned meanings, in the presence of a solvent so as to produce a compound of the formula:

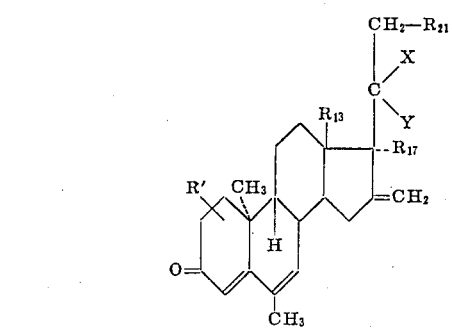

where R', $R_{13}$, $R_{17}$, $R_{21}$, X and Y have the aforementioned meanings.

The above methods a to t will be described in more detail hereinafter. When references to the literature are made, this means that the respective process is analogous to the process described in the literature quoted.

Concerning a

The acylation reaction is performed at a reaction temperature which may vary from room temperature to the boiling point of the solvent used. The solvent may be an aromatic hydrocarbon, such as benzene or toluene. Suitable acylating agents are carboxylic acid anhydrides, carboxylic acid chlorides or carboxylic acids.

The catalyst is an acid catalyst such, for example, as trifluoroacetic acid anhydride, hydrochloric acid or p.toluene sulfonic acid.

The starting materials for the method a are obtained by treating the corresponding 16-methyl-16-dehydro-compound compound with an oxydant, such as an organic peroxy acid or hydrogen peroxide. The said 16-methyl-16-dehydro compound is produced by treating a compound of the formula:

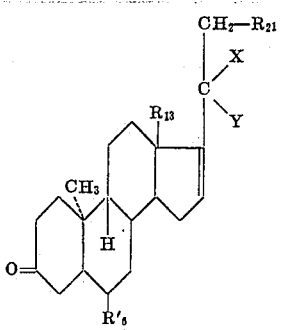

where $R_{13}$, $R_{21}$, X and Y have the above-mentioned meanings and $R'_6$ is a hydrogen atom or a methyl group, with diazomethane and by subsequently subjecting it to a pyrolysis reaction. If $R'_6$ is a hydrogen atom, the pyrolysis reaction is followed by an enolesterification or enoletherification reaction in which the corresponding 3-enolether-(ester)-3,5-bisdehydro compound is formed, and by a subsequent halogenation reaction in which the corresponding 3-keto-4-dehydro-6-chloro (or -6-fluoro) compound is produced. If desired, the latter compound may be subjected to a second enol-etherification followed by a second halogenation, resulting in a 3-keto-4-dehydro-6,6-dichloro-(or -6,6-difluoro) compound. The said enol-etherification, enol-esterification and halogenation are performed in the same manner as described in methods e, f and l.

The above-mentioned 3-enolether-3,5-bisdehydro compounds may, instead of being halogenated, be reacted with trichloro-monobromo-methane in the presence of pyridine, after which the resulting 3-keto-4-dehydro-6-trichloromethane compound is treated with methanol-NaOCH₃, in which treatment the corresponding 6-dichloro-methylene compound is produced, and finally catalytically hydrogenated with a palladium catalyst on SrCO₃, in which reaction the corresponding 6-methyl compound is produced.

Concerning b

Esterification takes place by reacting the starting material with an acylating agent, such as a carboxylic acid, a carboxylic acid anhydride or a carboxylic acid chloride, in the presence of a catalyst, such as p.toluene sulfonic acid, trifluoro-acetic acid anhydride, or in the presence of an acid binder, such as pyridine or collidine.

Etherification is effected by treating the starting material with an alkylating agent. For this purpose, the following methods may be used.
1. A reaction with an alkylhalide or aralkylhalide in the presence of $Ag_2O$.
2. A reaction with dihydropyran or dihydrofuran in a medium which is mildly acid, mildly alkaline or neutral.

Starting materials for the method b may be obtained inter alia by subjecting a compound of the formula

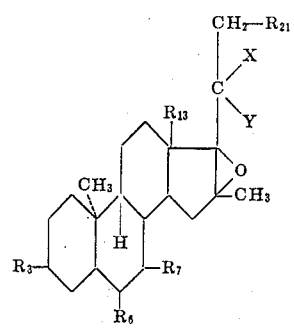

where $R^2$, $R_6$, $R_7$, $R_{13}$, $R_{21}$, X and Y have the meanings given in method b, to a ring opening reaction.

The ring opening is effected by treating the starting material with an acid catalyst in the presence of a solvent. Examples of suitable catalysts are inorganic acids, such as HCl or HBr, or organic acids, such as p.toluene sulfonic acid or sulfosalicylic acid. Benzene or toluene may be used as the solvent. The reaction temperature may vary from room temperature to the boiling point of the solvent.

Compound of the above formula may be synthesized in a manner similar to that described above with reference to a, i.e., by oxydation of the corresponding 16-methyl-16-dehydro compound. The 16-methyl-16-dehydro compound also is produced by the method described with reference to a. In this connection it should be noted that the introduction of a 1,2 double bond, a 6,7 double bond, a 6,7-methylene group or an esterified or etherified 3-OH group is effected after the pyrolysis reaction (see the commentary upon a in a manner mentioned above in the descriptions of the methods c, d, g, k and m, respectively. Alternatively, the said substituents may be introduced into the 16,17 -oxido compound as defined with reference to method a.

Starting materials containing a 1,2-methylene group are produced by reacting a compound of the formula

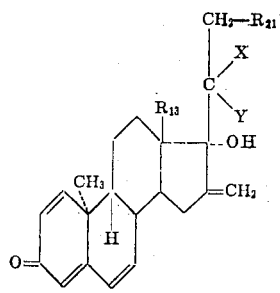

which may be obtained by the aforementioned processes and in which $R_{13}$, $R_{21}$, X and Y have the aforementioned meanings, except for the combination $R_{21}$ = esterified hydroxy and X and Y = oxygen atoms, with dimethylsulfoxoniummethylide, resulting in a compound of the formula

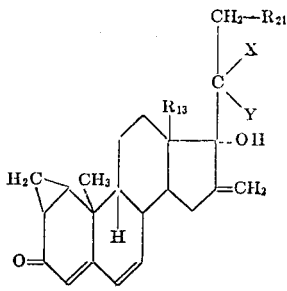

This substance may be catalytically hydrogenated (see also method s), in which reaction the corresponding 3-keto-4-dehydro steroid is obtained. The latter compound may be converted into a 3-enolether(or -ester)-3,5-bis-dehydro steroid by enol-esterification or enol-etherification, then halogenated and finally hydrolyzed. The resulting substance corresponds to the formula:

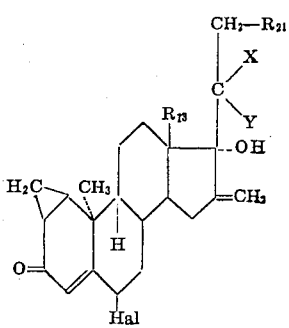

where Hal is a halogen atom,
Instead of the aforementioned hydrolysis an enol-etherification reaction followed by 6,7-dehydrogenation and hydrolysis may be effected. The resulting product may be represented by the formula

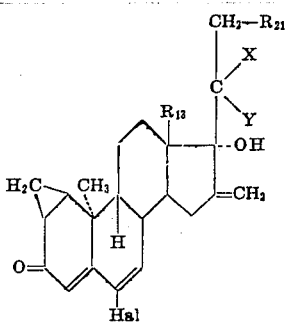

Further, the aforementioned compounds of the formulae

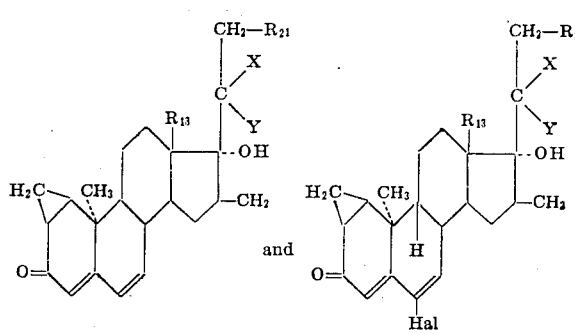

may be treated with dimethylsulfoxoniummethylide to yield the corresponding 3-keto-4-dehydro-6,7-methylene steroids. The reactions with dimethylsulfoxoniummethylide will give higher yields if the 17-OH group present in the starting material is protected during the reactions by means of an ether group. For this purpose the starting material is treated preferably with dihydropyran or dihydrofuran in a weakly acetic, weakly alkaline or neutral medium, during which treatment the 17-OH group is converted into a 17-tetrahydropyranyloxy or 17-tetrahydrofuranyloxy group. After the reaction with dimethylsulfoxoniummethylide the 17-ether group may be reconverted into the 17-OH group by hydrolysis.

Starting products for the method b may alternatively be obtained by means of the following processes:
a compound of the formula:

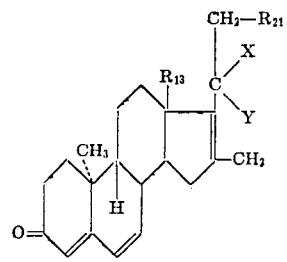

where $R_{13}$, $R_{21}$, X and Y have the aforementioned meanings, is epoxidized with an excess amount of an oxidizing agent, such as a 250 percent excess of an organic peroxy acid,
a compound of the formula

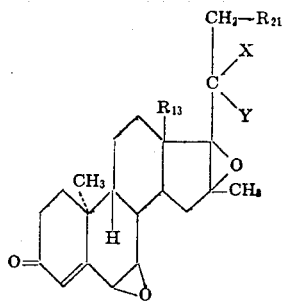

where $R_{13}$, X and Y and $R_{21}$ have the aforementioned meanings, being formed. The latter compound is then treated with hydrochloric acid and acetic acid or with hydrogen fluoride and acetic acid, a compound of the formula:

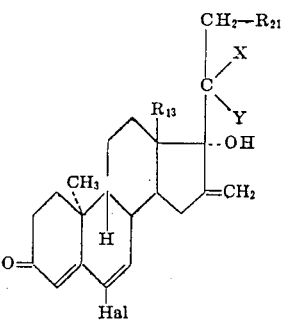

where Hal is a chlorine or fluorine atom, being obtained.

It should be noted that especially the method *b* is particularly suitable for producing the compounds according to the invention.

Concerning *c*

Introduction of a $\Delta^1$ double bond.

A double bond between the carbon atoms one and two may be introduced by means of the following processes:

a. by microbiological 1-dehydrogenation, for example with Corynebacterium simplex, Nobile et al., J. Am. Chem. Soc. 77, 4184 (1955), 10α b. by direct 1-dehydrogenation.
1. with seleniumdioxyde, J.H. Fried et al., J. Am. Chem. Soc. 81, 1235 (1959) A. Bowers et al., J. Am. Chem. Soc. 81, 5991 (1959)
2. with chloranil E.J. Agnello and G.D. Laubach, J. Am. Chem. Soc. 82, 4293 (1960).
3. with 2,3-dichloro-5,6-dicyanobenzoquinone, D. Burn et al., Proc. Chem. Soc. 1960 (14).

Concerning *d*

Introduction of a $\Delta^6$ double bond

A 6,7 double bond may be introduced by means of the following processes:

a. by direct 6-dehydrogenation of 3-keto-$\Delta^4$-9β, 10α-steroids
1. with substituted benzoquinones, such as chloranil (E.J. Agnello and G.D. Laubach, J. Am. Chem. Soc. 82, (1960)) or 2,3-dichloro-5,6-dicyano benzoquinone (Bowers, J. Am. Chem. Soc. 81, 5991 (1959)), (H.J. Ringold and A. Turner, Chem. and Ind. 1962, 211),
2. with manganese dioxide, (F.Sondheimer et al, J.Am. Chem. Soc. 75, 5932 (1953));

b. by reacting $\Delta^{3,5}$-3-enolether-6-halo steroids with a halogen-substituted benzoquinone, such as 2,3-dichloro-5,6-dicanyobenzoquinone;

c. oxydation of 3-enolether-$\Delta^{3,5}$-6-halo steroids with tert.butylchromate or with manganese dioxyde in acetic acid yields 3-keto-$\Delta^{4,6}$-6-halo steroids (K. Yasuda, Chem. Pharm. Bull.11, 1167 (1963) and H. Els et al., Helv. Chem. Act. 48, 989 (1965);

d. by halogenation of a $\Delta^{3,5}$-3-enolether(or -ester) compound having a halogen atom or a methyl group in the 6-position and subsequent dehydrohalogenation, resulting in a 3-keto-4,6-bisdehydro-6-halo compound or a 3-keto-4,6-bisdehydroethyl compound, respectively.

The halogenation of a $\Delta^{3,5}$-3-enolether compound may be performed with a halogen, such as bromine or chlorine (L.H. Knox, J.Am.Chem.Soc. 82, 1230 (1960)) or with N-halo-imides, such as bromosuccinic imide (same literature reference). The halogenation of a $\Delta^{3,5}$-3-enol ester compound may alternatively be effected with a halogen (H.H.Imhofen, C.A. 53, 456 (1959)) or with N-halo-imides (C.Djerassi, J.Am. Chem. Soc. 77, 3827 (1955)).

The dehydrohalogenation is preferably performed by reaction with an organic base, such as pyridine or collidine.

Concerning *e*

Introduction of a 3-enolether (or 3-enolester)-$\Delta^{3,5}$ system by a. enol-etherification of a 3-keto-$\Delta^4$ steroid with an orthoformate ester in the presence of a catalyst, for example with ethyl orthoformate and hydrogen chloride (A. Serini et al., Ber. 71, 1766 (1938)) or ethylortho-formate with p.toluene sulfonic acid (R.Gardi et al., J.Org. Chem. 27, 668 (1962) and A.D.Cross et al., Steroids 6, 198 (1963)).

b. enolesterification may be effected by means of, for example, isopropenyl acetate in the presence of an acid catalyst, such as p.toluene sulfonic acid or sulfuric acid or by means of an acid anhydride in the presence of, for example, p.toluene sulfonic acid. When the starting material contains a 17-OH, a 20-OH and/or a 21-OH group, this group will be esterified.

Concerning *f*

Introduction of a 6-chlorine or a 6-fluorine atom a. By chlorination or fluorination of a $\Delta^{3,5}$-3-enolether steroid with chlorine (L.H. Knox, J.Am.Chem. Soc. 82, 1230 (1960)), chlorosuccino-imide or perchloryl fluroide (S.Nakanischi, J.Am.Chem.Soc. 81, 5259 (1959));

b. by chlorination or fluorination of a $\Delta^{3,5}$-3-enolester steroid with chlorine (H.H.Imhofen, C.A. 53, 456 (1959)) or chlorosuccinoimide (C.Djerassi, J.Am.-Chem Soc. 77, 3827 (1955)) or perchloryl fluoride (B-M. Bloom, Chem. and Ind. 1959, 1317).

Concerning *g*

Introduction of a 6,7-methylene group

The methylenation reaction is performed with dimethyl sulfoxonium methylide in the presence of an aprotic solvent. Suitable solvents are, for example, ethers, such as dioxan or tetrahydrofuran, and dimethyl sulfoxide.

The reaction temperature may vary between 0°C and 80°C and preferably lies between 15°C and 30°C.

The reagent is produced by treating trimethyl sulfoxonium iodide with a base, such as an alkali hydroxide, in the presence of a solvent, such as dimethyl sulfoxide.

Concerning *h*

The esterification may be carried out with an acylating agent in the manner described in the commentary upon *b*.

Concerning *i*

The esterification is effected by reacting the starting material with a carboxylic acid chloride or anhydride in the presence of a base, such as pyridine or collidine.

Concerning *l*

Suitable chlorinating agents are, for example, chlorine, N-chloro-succinic acid imide or N-dichlorobenzene sulfonamide.

Concerning *m*

Esterification may be carried out with a carboxylic acid chloride or anhydride in the presence of a base, such as pyridine or collidine. Etherification takes place by treatment with an alcohol in the presence of catalytic amount of an acid, such as HCl.

The starting product of the method *m* is produced by reducing the corresponding compound which contains a 3-keto-oxygen atom. Reduction to the 3-OH group may take place by treatment with $NaBH_4$ in methanol or tetrahydrofuran at a low temperature (0°C) or with LiAlH [L.OBu]₃.

Concerning *n*

The reaction is performed in an aprotic solvent such as acetonitrile. The reaction is preferably carried out in the presence of calcium fluoride, for example by using the calcium fluoride as the carrier material on which the reagent AgF is suspended. The starting material for the method *n* is produced by reacting the corresponding 21-$CH_3$ compound with $I_2$/CaO in methanol at a temperature of about 30°C.

Concerning o

A 20-keto-oxygen atom may be reduced by means of, for example, $LiAlH_4$ or an alkali metal in an alcohol (absolute ethanol or propanol-2).

Since any 3-keto-oxygen atom present will also be reduced, in such a case the reduction must be followed by selective oxidation of the 3-OH-group. Oxidizing agents suitable for this purpose are substituted benzoquinones, such as 2,3-dichloro-5,6-dicyanobenzoquinone.

Concerning p

The reactions are performed in a solvent, such as a ketone, for example acetone. The reaction temperature preferably is equal to the boiling point of the solvent used.

Concerning q

The hydrolysis is performed under mild conditions in order to prevent the substituent $R_{17}$ from being also hydrolyzed. Satisfactory hydrolysis may be performed with an alkali metal carbonate in the presence of methanol and water.

Concerning r

The dehydration may be performed, for example, with hydrogen chloride or hydrogen bromide in a solvent such as dioxan (K. Bruckner, Chem. Ber. 94, 1225 (1961)).

The starting compounds for the method r are obtainable by reacting a 3-keto- $\Delta^{4,6}$ steroid with chromyl chloride or by reacting a 3-keto- $\Delta^{4,6}$ steroid with an organic peroxy acid, such as monoperphthalic acid, according to a process described by Bruckner. Chem. Ber. 94, 1225 (1961), in which the corresponding 6,7-epoxide is produced, with a subsequent reaction with hydrogen chloride.

Concerning s

The catalytic hydrogenation may be performed with a palladium catalyst suspended on carbon, $BaSO_4$, $CaCO_3$ or $SrCO_3$. The reaction may be performed in a solvent such as an aromatic hydrocarbon, for example benzene or toluene.

Concerning t

Isomerisation is performed with palladium as a catalyst in a reaction medium containing, among other substances, cyclohexene, sodiumacetate and absolute ethanol (solvent). The reaction temperature corresponds to the boiling point of the solvent used. The starting material for the method t is obtained by treating a corresponding steroid containing no 6-substituent with pyrrolidine, after which the resulting 3-enamine-3,5-bisdehydro steroid is treated with metaldehyde in ethanol-benzene and finally the resulting 3-keto-4-dehydro-6-hydroxymethyl compound is dehydrated.

In addition to the aforementioned progestational and anti-ovulatory activities the compounds according to the invention also exhibit strong deciduoma-forming properties. Further, the compounds are anti-estrogenic and capable of maintaining pregnancy and inducing ovulation.

Because of their endocrinological activities the substances according to the invention are suitable for the following uses: as contraceptives, for maintaining pregnancy, in counteracting or preventing habitual or threatening abortion, in counteracting sterility, acne, hirsutism, dysmenorrhea, menorrhagia, oligo- and polymenorrhea, primary and secondary amenorrhea, hyper- and hypomenorrhea, premenstrual tension, and for inducing ovulation.

The compounds according to the invention are particularly suited for antifertile use.

For practical use the compounds according to the invention are worked up into preparations or pharmaceutic solid dosage forms suitable for oral and parenteral administration.

Examples of preparations or dosage forms according to the invention are injection liquids, powders, capsules, implantation capsules, tablets, dragees, pills and pessaries.

In all these forms the active compound according to the invention is mixed with a solid or liquid inert carrier material, if desired in the presence of adjuvants, such as surfactants, lubricants, binders, disintegrating agents and solvents.

Owing to the high level of endocrinologic activity of the compounds according to the invention the amount of active substance in a dosage unit of the preparation according to the invention may be small.

In general an amount of active substance of from 0.001 to 1 mg per dosage unit will be sufficient to produce the desired pharmaceutical effect.

In this connection it should be pointed out that the said dosage unit relates to a daily dose to be administered on several consecutive days. When the dosage characteristic is different and, for example, several dosage units are administered daily or only one of a few dosage units are administered quarterly, for example in the case of parenteral administration, the amount of active substance per dosage unit will obviously have to be proportionally modified.

The preparations according to the invention may contain, in addition to the active substance according to the invention, another, known endocrinologically active compound. Thus, the preparation according to the invention may also contain an estrogenic substance, such as ethynyl estradiol or mestranol. Such combined preparations according to the invention will especially be used for antifertile uses and for the treatment of endometriosis and dysmenorrhea.

A highly important and interesting use of the preparations according to the invention is the abovementioned antifertile use. In principle, the method of treatment in antifertile use of the preparations according to the invention is not different from the conventional methods in this field.

Thus, in agreement with the classic method, combined preparations according to the invention which also contain an estrogenic compound may be administered daily in the form of tablets. As an alternative, according to the sequence method the combined preparation according to the invention may be administered for part of the menstrual cycle, for example daily during 5 days, an estrogenic substance being administered during another part of the cycle. However, the preparations according to the invention may advantageously be administered in the "low progestogen treatment." According to this method, during the cycle a progestational substance is administered periodically, for example daily. Since in this method, in which no estrogen is used, it is important that a potent progestational substance should be available, the highly active preparations according to the invention will offer direct advantages.

The aforementioned amount of active substance per dosage unit of the preparation according to the invention may, in accordance with the antifertile method used, be detailed as follows:

a. Classic antifertile method
Dosage characteristic:
  daily administration of a tablet during the cycle.
Composition of the tablet:
  0.01 - 1 mg of 6-fluoro-16-methyl-ene-17α-acetoxy-9β,10α-pregna-4,6-diene-3,20-dione, 0.01 - 0.1 mg of ethynyl estradiol made up to a tablet weight of from 30 to 300 mg with carrier material and adjuvants.

b. Sequence method
Dosage characteristic:
  1. daily administration of one tablet during 5 days of the cycle.
  2. daily administration of a tablet during 15 or 16 days of the cycle.
Composition of a tablet:
  the tablet relating to b1 has the same composition as that described in a,
  the tablet relating to b2, contains:
  0.05 to 0.1 mg of mestranol made up to a tablet weight of from 30 to 300 mg with carrier material and adjuvants.

c. Low progestogen treatment
Dosage characteristic:
  daily administration of 1 tablet during the cycle.
Composition of a tablet:
  from 0.001 to 0.1 mg of 6-fluoro-16-methylene-17α-acetoxy-9β,10α-pregna-4,6-diene-3,20-dione, made up to a tablet weight of from 30 to 300 mg with carrier material and adjuvants.

Instead of the above-mentioned use of oral preparations injectable preparations may be used.

An injection preparation according to the invention may be administered quarterly and contains from 0.1 to 1 mg of an active compound according to the invention.

The preparations according to the invention may be produced by mixing the active substance with a solid carrier material or by dissolving or dispersing it in a liquid carrier material, if desired with the addition of adjuvants, such as lubricants, binders, desintegrating agents, surfactants and solvents.

The combination preparations according to the invention are obtained by adding a known endocrinologically active substance, such as an estrogen, to the constituents to be mixed, dissolved or dispersed.

Suitable solid carrier materials for oral preparations, such as tablets and dragees, are, for example, disaccharides and polysaccharides, such as saccharose, lactose, glucose and dextrose, cellulose and cellulose derivatives, such as carboxymethyl cellulose, methylcellulose, ethyl cellulose, hydroxyethyl cellulose and hydroxypropyl cellulose, alginic acids, salts of alginic acids and hemicelluloses, such as gallactomannan.

Suitable liquid carrier materials for injection preparations are, for example, arachis oil, sesame oil, soya oil, olive oil and mixtures of these or similar vegetable oils, and furthermore isopropyl myristate and ethyl oleate.

Suitable binders are, for example, gelatine, pectine, amylose, agar-agar, tragacanth, polyethylene glycols, gum arabic and polyvinyl pyrrolidone. Suitable desintegrating agents are, for example, aminopectins, starches such as maize starch, potato starch and rice starch, formalin casein, bentonite, silicon dioxide and ion exchangers. Suitable lubricants are, for example, polyethylene gylcols, stearic acid, salts of stearic acids, such as magnesium stearate and aluminium stearate.

Suitable surfactants are, for example, wetting agents, such as sodium dioctylsulfosuccinate, sodiumlaurylsulfate, polyoxyethylenesorbitan monolaureate polyoxyethylenealkyl ethers and sulfated cetyloleyl alcohol.

Suitable solvents, for example for producing injection preparations, are methylene chloride and benzyl alcohol.

Tablets or dragees according to the invention may be obtained, for example, by mixing the desired amount of the active substance with a solid carrier material such, for example, as one of the aforementioned carrier materials, together with adjuvants such, for example, as a starch, magnesium stearate and talc. The resulting mixture is homogenized and worked up into tablets or dragees.

The tablets or dragees may, if desired, be provided with sugar coating which may consist of the following ingredients: talc, gelatin, gum arabic, potato starch, saccharose and a dye. Instead of a sugar coating another film-forming agent may be used, for example ethylcellulose or polyacrylates.

Injection liquids may be obtained by dissolving the active substance in methylene chloride, taking up the solution in arachis oil and then evaporating the solvent. Ampules and bottles are filled with the resulting solution, sealed and finally sterilized by heating them at 120°C for some time.

For further details of the composition of the preparations according to the invention we refer to the following examples.

EXAMPLES

1. Production of 6-chloro-16-methylene-17α-hydroxy-9β,10α-pregn-4-ene-3,20-dione 17-acetate a. (17 α, 16α-c)-pyrazolino-9β,10α-pregna-4,6-diene-3,20-dione Diazomethane obtained by adding a solution of 15 g of KOH in 375 ml of 90 percent ethanol to a solution of 75 g of tolylsulfonylmethyl nitrosoamide in 1.1 l of diethyl ether and heating the resulting solution, is introduced into a solution of 30 g of 9β10α-pregna-4,6,16-triene-3,20-dione. The mixture is maintained at 0°C for 5 hours and then heated to room temperature. The precipitate (17 α, 16 α-c)-pyrazoline-9β,10α-pregna-4,6-diene-3,20-dione, is allowed to stand for 3 days and then drawn off. Melting point 188°-189°C with decomposition.

b. 16-methyl-9β,10α-pregna-4,6;16-triene-3,20-dione 31 g of (17α, 16α-c)-pyrazolino-9β,10α-pregna-4,6-diene-3,20-dione is slowly added to 60 ml of paraffin oil and 1 ml pyridine at a temperature of 190°C. The addition is performed in a $N_2$ atmosphere. On termination of the gas evolution the reaction mixture is cooled and the crude product is drawn off. Recrystallisation from methylenechloride hexane yields pure 16-methyl-9β,10α-pregna-4,6;16-triene-3,20-dione. Melting point 156.5 - 158.5°C.

c. 16β-methyl-16,17-oxido-9β,10α-pregna-4,6-diene-3,20-dione

A solution of metachloroperbenzoic acid (75 percent excess) in 50 ml of ether is added to a solution of 10 g of 16-methyl-9β, 10α-pregna-4,16;16-triene-3,20-dione in 250 ml of 1,2-dichloroethane. Temperature 10°C. The mixture is maintained at a temperature of 15°C for 45 hours and washed successively with a 5 percent sodiumdisulfate solution, a 5 percent bicarbonate solution and water. The resulting residue is dried and the solvents are evaporated. The product is purified chromatographically. The melting point of 16-methyl-16,17-oxido-9β,10α-pregna-4,6-diene-3,20-dione is 144°–146°C.

As an alternative to the described oxidation by means of a peroxyacid, oxidation may be effected by means of $H_2O_2$.

d. 16-methylene-17α-hydroxy-9β, 10α-pregna-4,6-diene-3,20-dione 2, 1 g of 16β-methyl-16,17-oxido-9β,10α-pregna-4,6-diene-3,20-dione is dissolved in 50 ml of benzene to which 84 mg of p. toluenesulfonic acid is added. The mixture is heated at refluxing temperature for 4 hours, then cooled and washed with a 5 percent $Na_2CO_3$ solution and water. The mixture is dried, the solvents are evaporated and the residue is crystallized from ether. The melting point of the resulting 16-methylene-17α-hydroxy-9β, 10α-pregna-4,6-diene-3,20-dione is 206-208°C.

e. 16-methylene-17α-hydroxy-9β, 10α-pregna-4,6-diene-3,20-dione 17-acetate

A mixture of 1.4 g of 16-methylene-17α-hydroxy-9β, 10α-pregna-4,6-diene-3,20-dione and 1,4 g of p. toluenesulfonic acid in 60 ml of acetic acid and 12 ml of acetic anhydride is maintained at room temperature for 2 hours. The mixture is then poured in water and extracted with methylene chloride. The extract is washed with water and a 5 percent $NaHCO_3$ solution and then dried. After evaporation of the solvents the residue is crystallized from ether. The melting point of 16 -methylene-17 α-hydroxy-9β, 10α-pregna-4,6-diene-3,20-dione is 145°–146°C.

f. 16 -methylene-17α-hydroxy-9β, 10α-pregna-4,6-diene-3,20-dione 17 -acetate is dissolved in toluene and hydrogenated with 5 percent of palladium on $CaCO_3$ as a catalyst. After the reaction mixture has been worked up and the residue has been crystallised from ether, pure 16 -methylene-17α-hydroxy-9β, 10α-pregn-4-ene-3,20-dione 17-acetate having a melting point of 190°–194°C is obtained.

g. A solution of 16 -methylene-17α-hydroxy-9β, 10α-pregn-4-ene-3,20-dione 17-acetate in toluene and acetic anhydride, to which a small amount of p-toluenesulfonic acid has been added, is boiled in a nitrogen atmosphere under anhydrous conditions. After 3.5 hours one half of the toluene is distilled off and the residual mixture is poured in ice water to which pyridine has been added. The aqueous layer is extracted with methylene chloride and the resulting extracts are washed with water, dried and finally dried by evaporation. The crystalline product is recrystallized from methanol to which a small amount of pyridine has been added. The resulting 3,17α-dihydroxy-16-methylene-9β, 10α-pregna-3,5-diene-20-one 3,17-diacetate has a melting point of 160°–161°C.

h. To a stirred cold solution of 8.1 g of 3,17α-dehydroxy-16-methylene 9β, 10α-pregna-3,5-diene-20-one 3,17-diacetate in 130 ml of ether there are added a solution of 15 g potassium acetate in 330 ml of acetic acid and 55 ml of water and a solution of 1.1 cc. of chlorine in 37 ml of acetic acid. Temperature −10°C. After the usual working up, the resulting crude product is chromatographed, with the result that 7.9 g of a mixture consisting of 6α- and 6β-chloro-16-methylene-17α-hydroxy-9β, 10α-pregn-4ene-3,20-dione 17-acetate is obtained.

2. Production of 6-chloro-16-methylene-17α-hydroxy-9β-10α-pregn-4-ene-3,20-dione 17-acetate In the same manner as described in the above Example I, parts a, b and c, except that instead of (17α, 16α-c-)-pyrazolino-9β, 10α-pregna.4,6-diene-3,20-dione the starting material is (17α, 16α-c)-pyrazolino-9β, 10α-pregn-4-ene-3,20-dione, the compound 16β-methyl-16,17-oxido-9β, 10α-pregn-4-ene-3,20-dione has been synthesized. Melting point 155°–157°C. This substance may also be obtained by catalytic hydration of 16-methyl-9β, 10α-pregna-4,6;16-triene-3,20-dione and subsequent epoxidation.

A solution of 10.6 g of 16-methyl-16,17-oxido-9β, 10α-pregn-4-ene-3,20-dione and 0, 175 g of p.toluenesulfonic acid in 250 ml of anhydrous toluene and 38 ml of acetic anhydride is boiled in a nitrogen atmosphere under anhydrous conditions. In about 3.5 hours 130 ml of toluene is distilled off and the remaining solution is poured in a mixture of 500 g of ice water and 200 ml of pyridine. The water layer is extracted twice with methylene chloride and the combined extracts are washed with water, dried and finally dried by evaporation. Recrystallisation of the crystalline product from methanol to which a small amount of pyridine has been added yields pure 3, 17α-dihydroxy-16-methylene-9β, 10α-pregna-3,5-diene-20-one 3, 17-diacetate. Melting point 160°–161°C.

In the same manner as has been described in Example 1, part h, 3, 17α-dihydroxy-16-methylene-9β, 10α-pregna-3,5-diene-20-one 3, 17-diacetate is converted into a mixture comprising 6α- and 6β-chloro-16-methylene-17α-hydroxy-9β,10α-pregn-4-ene-3,20-dione 17-acetate.

3. Production of 6-chloro-16-methylene-17α-hydroxy-9β, 10α-pregn-4-ene-3,20-dione 17-acetate 16-methyl-16, 17-oxido-9β, 10αpregn-4-ene-3,20-dione is converted into 16-methylene-17α-hydroxy-9β, 10α-pregn-4-ene-3,20-dione in the same manner as has been described in Example 1, part d.

The latter compound is dissolved in a mixture of toluene and acetic anhydride to which a small amount of p.toluenesulfonic acid has been added. The solution is boiled in a nitrogen atmosphere under anhydrous conditions, whereupon one half of the toluene is distilled off.

The residue is poured in a mixture of ice water and pyridine. The water layer is extracted several times with methylene chloride, after which the combined extracts are washed with water, dried and finally dried by evaporation. The crystalline product is recrystallized from methanol containing a small amount of pyridine. The obtained pure 3, 17α-dihydroxy-16-methylene-9β, 10α-pregna-3,5-diene-20-one 3, 17-diacetate has a melting point of 160°–161°C.

The latter compound is converted, in the same manner as has been described in Example 1, part h, into a mixture consisting of 6α- and 6β-chloro-16-methylene-17α-hydroxy-9β, 10α-pregn-4-ene-3,20-dione 17-acetate.

4. Production of 3-ethoxy-6-chloro-16methylene-17α-hydroxy-9β, 10α-pregna-3,5-diene-20-one 17-acetate and 6-chloro-16-methylene-17α-hydroxy-9β, 10α-pregna-4,6-diene-3,20-dione 17-acetate.

a. 7.5 ml of ethylorthoformate and 0.3 g p.toluenesulfonic acid are added to a solution of 7.9 g of a mixture of 6α- and 6β-chloro-16-methylene-17α-hydroxy-9β, 10α-pregn-4-ene-3,20-dione 17-acetate in 150 ml of anhydrous dioxan. The solution is stored in the dark for 20 hours. The obtained 3-ethoxy-6-chloro-16-methylene-17α-hydroxy-9β, 10α-pregna-3,5-diene-20-one 17-acetate is used for the next reaction step without further purification.

b. The solution of the aforementioned enolether in dioxan is added to a suspension of 35 g of manganese dioxide in 400 ml of acetic acid and 35 ml of water. After stirring for 1 hour the manganese dioxide is filtered off and the filtrate is concentrated in a vacuum. The residue is dissolved in methylene chloride and the solution is washed with water 5 percent sodium dicarbonate and water. After drying and evaporation of the solvent the residue is chromatographed. Yielding pure 6-chloro-16-methylene-17α-hydroxy-9β, 10α-pregna-4,6-diene-3,20-dione 17-acetate having a melting point of 194°–196°C (with decomposition).

5. Production of 6-chloro-16-methylene-17α-hydroxy-9β, 10α-pregna-4,6-diene-3,20-dione 17-acetate.

In a nitrogen atmosphere and at a temperature of −20°C a solution of 1.5 ml of chromylchloride in 10 ml of methylenechloride is added to a solution of 0,69 g of 16-methylene-17α-hydroxy-9β, 10α-pregna-4,6-diene-3,20-dione, 17-acetate in 50 ml of methylene chloride.

After being stirred at −20°C for 3 hours, the reaction mixture is poured in a cold solution of 6.4 g of sodium acetate and 11.2 g of sodium pyrosulfite in 150 ml of water. The organic layer is separated off, and the water layer is twice extracted with ethyl acetate. The combined extracts are washed successively with a 5 percent sodium acetate solution, saturated sodium chloride solution, a 1 percent sodium bicarbonate solution and water. The resulting chlorohydrin compound is isolated chromatographically and without further purification dehydrated by dissolving the chlorohydrin in a hydrochloric acid dioxan solution (16 mg of hydrochloric acid per ml). After 4 hours the reaction is complete, and the reaction product is worked up in the usual manner. Finally the residue is chromatographically purified, yielding 6-chloro-16-methylene-17α-hydroxy-9β, 10α-pregna-4,6-diene-3,20-dione 17 -acetate having a melting point of 196°C (with decomposition).

6. Production of 6-chloro-16-methylene-17α-hydroxy-9β, 10α-pregna-4,6-diene-3,20-dione 17α-acetate.

a. 6β,7;16α,17-dioxido-16-methyl-9β10α-pregn-4-ene-3,20-dione.

At a temperature of 10°C a solution of meta-chloroperbenzoic acid (in an excess of 175 percent) in 50 ml of ether is added to a solution of 10 g of 16-methyl-9β, 10α-pregna-4,6;16-triene-3,20-dione in 250 ml of 1,2-dichloroethane.

The reaction mixture is maintained at a temperature of 15°C for 45 hours and then washed successively with a 5 percent sodium disulfate solution, a 5 percent sodium bicarbonate solution and water. The residue is dried, evaporated to dryness and then chromatographed. The resulting 6β,7;16α, 17-dioxido-16-methyl-9β, 10α-pregn-4-ene-3,20-dione has a melting point of 175°–179°C.

b. 6-chloro-16-methylene-17α-hydroxy-9β, 10α-pregna-4,6-diene-3,20-dione 0.15 g of 6β,7; 16α, 17-dioxido-16-methyl-9β, 10α-pregn-4-ene-3,20-dione is dissolved at 20°C in 9 ml of acetic acid saturated with hydrogen chloride.

After 60 minutes the reaction mixture is poured in water and extracted with ether. The extract is washed successively with water. A 5 percent sodium bicarbonate solution and water. The solvent is evaporated, the residue is chromatographed and finally crystallized from ether. The resulting 6-chloro-16-ethylene-17α-hydroxy-9β, 10α-pregna-4,6-diene-3,20-dione has a melting point of 212°C (with decomposition).

c. 6-chloro-16-methylene-17α-hydroxy-9β, 10α-pregna-4,6-diene-3,20-dione 17-acetate The compound mentioned in the preceding part b is converted into 6-chloro-16-ethylene-17α-hydroxy-9β, 10α-pregna-4,6-diene-3,20-dione 17-acetate in the same manner as has been described in Example 1, part e. Melting point 196°C, with decomposition.

7. 6-chloro-16-methylene-17α-hydroxy-9β, 10α-pregna-4,6-diene-3,20-dione 17-caproate 0.125 g of 6-chloro-16-methylene-17α-hydroxy-9β, 10α-pregna-4,6-diene-3,20-dione in a mixture of 5 ml of caproic acid and 1.25 ml of trifluoracetic acid anhydride is stirred at 60°C under a reflux condenser for 1 hour. The product is poured in water and extracted with benzene. The extract is washed successively with 0.5 N sodium hydroxide and water until neutral, then dried and evaporated to dryness. After chromatography on silicagel in a mixture of benzene and acetone pure 6-chloro-16-methylene-17α-hydroxy-9β, 10α-pregna-4,6-diene-3,20-dione 17-caproate having a melting point of from 103°C to 106°C is obtained (from n-hexane).

8. Production of 6α-fluoro-and 6β-fluoro-16-methylene-17α-hydroxy-9β, 10α-pregna-4-ene-3,20-dione 17-acetate A gas comprising nitrogen and perchlorylfluoride (1:1) is passed through a well stirred solution of 19.7 g of 3, 17-dihydroxy-16-methylene-9β, 10α-pregna-3,5-diene-20-one 3, 17-diacetate in 900 ml of dioxan and 300 ml of water for 2 hours. The excess of perchlorylfluoride is removed by means of a stream of gaseous nitrogen, after which the reaction mixture is poured in water and then extracted with methylene chloride - n.hexane. The extracts are washed successively with water, a 5 percent bicarbonate solution and water. After the extracts have been dried, the solvents are evaporated and the residue is chromatographed. As a result 6α-fluoro-16-methylene-17α-hydroxy-9β, 10α-pregn-4-ene-3,20-dione 17-acetate having a melting point of 203°–206°C and 6β-fluoro-16-methylene-17α-hydroxy-9β, 10α-pregn-4-ene-3,20-dione 17-acetate are obtained.

9. Production of 6-fluoro-16-methylene-17α-hydroxy-9β, 10α-pregna-4,6-diene-3,20-dione 17-acetate a. 3-ethoxy-6-fluoro-16-methylene-17α-hydroxy-9β, 10α-pregna-3,5-diene-20-one 17-acetate A solution of 7.4 g of 6α (and 6β)-fluoro-17α-hydroxy-16-methylene-9β, 10α-pregn-4-ene-3,20-dione 17-acetate and 300 mg of paratoluene sulfonic acid in 140 ml of dry dioxan and 7.5 ml of ethylorthoformate is stirred in the dark in a nitrogen atmosphere at 20°C for 18 hours. The reaction mixture is then poured in 1 liter of petroleum ether (40°–65°C) and 2 ml of pyridine, and this solution is filtered over silicagel. This yields 3-ethoxy-6-fluoro-17α-hydroxy-16-methylene-9β,10α-pregna-3,5-diene-20-one 17-acetate b. To the solution of the above enolether in dioxan there are successively added 70 ml of cold acetone, 0.75 g of sodium acetate in 7.5 ml of water, 2.25 g of N-bromosuccinimide and 0.75 ml of acetic acid. The mixture is stirred at 0°C for 30 minutes, then poured in water and subsequently extracted with petroleumether-methylenechloride. The extracts are washed successively with water, a 5 percent sodium bicarbonate solution and water. After drying and after the addition of 4 ml of pyridine, the extract is concentrated to a small volume in vacuo. Pyridine (10 ml) is again added and the mixture is heated in a nitrogen atmosphere for 90 minutes. The reaction mixture is worked up by diluting with water, extracting with methylenechloride-petroleumether and washing the resulting extracts successively with water, 2N-sulfuric acid, water, a 5 percent bicarbonate solution and water.

The residue obtained after drying and evaporation of the solvents is chromatographed, yielding 6-fluoro-16-methylene-17α-hydroxy-9β,10α-pregna-4,6-diene-3,20-dione 17-acetate having a melting point of 209°–210°C.

10. Production of 6,6-difluoro-17α-hydroxy-16-methylene-9β,10α-pregn-4-ene-3,20-dione 17-acetate.

A solution of 5.9 g of 3-ethoxy-6-fluoro-17α-hydroxy-16-methylene-9β,10α-pregna-3,5-diene-20-one 17-acetate in 120 ml of dry acetone is added to a solution of 3 g of dry potassium acetate in 85 ml of absolute ethanol. At 0°C and with stirring, perchlorylfluoride is passed through for 2 hours. Then nitrogen is passed through for 1 hour and subsequently the solid substance is drawn off and the filtrate is poured into 1,500 ml of ice water. The mixture is extracted with methylene and the extract is successively washed with water, a 5 percent sodium bicarbonate solution and water. Ater drying over sodium sulfate the solvent is removed by evaporation and the residue is chromatographed over silicagel. Tis yields pure 6-6-difluoro-17α-hydroxy-16-methylene-9β,10α-pregn-4-ene-3,20-dione 17-acetate.

11. Production of 6-fluoro-16-methylene-17α-hydroxy-9β,10α-pregna-4,6-diene-3,20-dione 17-acetate An enoletherification mixture consisting of 5 g of 6α-fluoro- and 6β-fluoro-16-methylene-17α-hydroxy-9β,10α-pregn-4-ene-3,20-dione 17-acetate in 100 ml of dioxan, 5 ml of ethyl orthoformate and 0.29 g of p. toluene sulfonic acid is added at room temperature to a well stirred suspension of 25 g of manganese dioxide in 270 ml of acetic acid and 20 ml of water. After 30 minutes the manganese dioxide is filtered off, the filtrate being worked up in the usual manner. The resulting 6-fluoro-16-methylene-17α-hydroxy-9β,10α-pregna-4,6-diene-3,20-dione 17-acetate has a melting point of 209°C.

12. Production of 6-fluoro-16-methylene-17α-hydroxy-9β,10α-pregna-4,6-diene-3,20-dione 17-caproate.

a. 6-fluoro-16-methylene-17α-hydroxy-9β,10α-pregna-4,6-diene-3,20-dione.

A mixture of 1.7 g of 6-fluoro-16-methylene-17α-hydroxy-9β,10α-pregna-4,6-diene-3,20-dione 17-acetate and 1.7 h of sodium perchlorate in 170 ml of 0.5 N methanolic sodium hydroxide is stirred at 20°C for 2.5 hours and then poured in 750 ml of water. After extraction with methylene chloride the extract is washed with water until neutral, dried over sodium sulfate and evaporated to dryness. The resulting residue is chromatographed over silicagel in a mixture of benzene and acetone. Crystallization from acetone and n-hexane yields 6-fluoro-16-methylene-17α-hydroxy-9β,10α-pregna-4,6-diene-3,20-dione having a melting point of 204°–205°C.

b. 6-fluoro-16-methylene-17α-hydroxy-9β,10α-pregna-4,6-diene-3,20-dione 17-caproate.

0.25 g of 6-fluoro-16-methylene-17α-hydroxy-9β,10α-pregna-4,6-diene-3,20-dione in a mixture of 10 ml of caproic acid and 2.5 ml of trifluoroacetic acid anhydride is heated at 60°C under a reflux condenser whilst stirring for 1 hour. The reaction mixture is then worked up by pouring in water and extraction with ether. The ethereal extract is washed with water, 0.5 N sodium hydroxide and water and then dried and evaporated to dryness. Chromatography of the resulting residue yields 6-fluoro-16-methylene-17α-hydroxy-9β,10α-pregna-4,6-diene-3,20-dione 17-caproate having an $\epsilon$ ($\lambda = 283$ nm) $= 20,000$ (methanol).

13. Production of 6-fluoro-16-methylene-17α-hydroxy-9β,10α-pregna-4,6-diene-3,20-dione 17-propionate In complete analogy with the method described for the caproate, 0.25 g of 6-fluoro-16-methylene-17α-hydroxy-9β,10α-pregna-4,6-diene-3,20-dione is esterified with 10 ml of propionic acid and 2.5 ml of trifluoricacetic acid anhydride, yielding 6-fluoro-16-methylene-17α-hydroxy-9β,10α-pregna-4,6-diene-3,20-dione 17-propionate having an $\epsilon$ ($\lambda = 283$ nm) $= 28,500$ (methanol).

14. Production of 6-fluoro-16-methylene-17α-methoxy-9β,10α-pregna-4,6-diene-3,20-dione To a solution of 0.45 g of 6-fluoro-16-methylene-17α-hydroxy-9β10α-pregna-4,6-diene-3,20-dione in 9 ml of dimethylformamide 4.4 ml of methyliodide and 0.9 g of newly precipitated silver oxide are added, after which the mixture is stirred for 19 hours with the exclusion of moisture. The mixture is then worked up by filtering, pouring the filtrate in water and extracting it with methylene chloride. The extract is washed until neutral, dried over sodiumsulfate and evaporated to dryness. The residue is chromatographed over silicagel and crystallized, yielding 6-fluoro-16-methylene-17α-methoxy-9β,10α-pregna-4,6-diene-3,20-dione having a melting point of 235°–237°C.

15. Production of 6-chloro-16-methylene-17α-hydroxy-9β,10α-pregna-1,4,6,-triene-3,20-dione 17-acetate 0.41 g of 6-chloro-16-methylene-17α-hydroxy-9β,10α-pregna-4,6-diene-3,20-dione 17-acetate and 0.45 g of 2,3-dichloro-5,6-dicyanobenzoquinone are dissolved in 10 ml of dioxan containing 1 mg of HCl per ml. After stirring for 90 minutes 50 g of calciumcarbonate are added, stirring being continued for 30 minutes.

The reaction mixture is filtered and the filtrate is refluxed for 90 minutes.

After working up, chromatographing and crystallising pure 6-chloro-16-methylene-17α-hydroxy-9β, 10α-pregna-1,4,6,-triene-3,20-dione 17-acetate is obtained, melting point 162°–163.5°C.

16. Production of 6-fluoro-16-methylene-17α-hydroxy-9β, 10α-pregna-1,4,6-triene-3,20-dione 17-acetate In the same manner as has been described in Example 15, 6-fluoro-16-methylene-17α-hydroxy-9β10α-pregna-4,6-diene-3,20-dione 17-acetate is converted into 6-fluoro-16-methylene-17α-hydroxy-9β, 10α-pregna-1,4,6-triene-3,20-dione 17-acetate.

17. Production of 6α-chloro-6,7;16-bismethylene-17α-hydroxy-9β, 10α-pregn-4-ene-3,20-dione 17-acetate 0.5 g of 6-chloro-16-methylene-17α-hydroxy-9β, 10α-pregna-4,6-diene-3,20-dione is added at room temperature in a nitrogen atmosphere to a well stirred solution of dimethylsulfoxoniummethylide (obtained from 0.5 g of trimethylsulfoxoniumiodide and 0.135 g of sodium hydride in 10 ml of dimethylsulfoxides). The reaction mixture is stirred for another hour, then poured in water and subsequently extracted with methylene-chloride-petroleumether. The extracts are successively washed with water, dilute NaOH and water. The residue obtained after drying and evaporation to dryness of the extracts is dissolved in a mixture of 0.25 g of p. toluenesulfonic acid, 5ml of acetic acid and 0.8 ml of acetic anhydride. After a reaction period of 1 hour the mixture is diluted with water and then worked up in the usual manner. Chromatographic purification yields 6α-chloro-6,7;16-bismethylene-17α-hydroxy-9β, 10α-pregn-4-ene-3,20-dione 17-acetate.

18. Production of 6-chloro-3,17α-dihydroxy-16-methylene-9β, 10α-pregna-2,4,6-triene-20-one 3,17-diacetate 0.33 g of 6-chloro-17α-hydroxy-16-methylene-9β, 10α-pregna-4,6-diene-3,20-dione 17-acetate in a mixture of 5 ml of acetic anhydride, 2 ml of acetylchloride and 0.2 ml of absolute pyridine is heated in a nitrogen atmosphere at 90°C for 3 hours. After concentration in vacuo the residue is chromatographed over silicagel. The useful fractions are concentrated by evaporation and crystallized from methanol, yiekding 6-chloro-3,17α-dihydroxy-16-methylene-9β, 10α-pregna-2,4,6-triene-20-one 3,17 -diacetate, melting point 185°–187°C.

19. Production of 6α-(and 6β)-fluoro-17α-hydroxy-1,2;16-bismethylene-9β, 10α-pregn-4-ene-3,20-dione 17-acetate a. 17α-hydroxy-1,2;16-bismethylene-9β, 10α-pregna-4,6-diene-3,20-dione A solution of 1,7 g of trimethylsulfoxonium iodide and 0.4 g of sodiumhydride (oil suspension 1 : 1) in 20 ml of dimethylsulfoxide was stirred at 20°C for 90 minutes and then filtered. 2ml of the filtrate was added to a stirred solution of 200 mg of 17α-hydroxy-16-methylene-9β, 10α-pregna-1,4,6-triene-3,20-dione in 2 ml of dry tetrahydrofuran. This mixture was stirred at 20°C for 6 hours and then poured in 20 ml of ice water. The mixture was then extracted with three portions of 5 ml benzene/ether (1 : 1) each, and the collected extracts were successively washed with three portions of 10 ml of water, three portions of 10 ml of 0.5 N sodium hydroxide and finally with water, until the washlayer was neutral. The solution was dried over sodium sulfate, then the solvent was distilled off at reduced pressure and the resulting residue was chromatographed over silicagel. Crystallization from a mixture of ether and (1 : 1) finally yielded 17α-hydroxy-1β,2;16-bismethylene-9β, 10α-pregna-4,6-diene-3,20-dione having a melting point of 237°–239°C.

b. 17α-hydroxy-1,2;16-bismethylene-9β, 10α-pregn-4-ene-3,20-dione 1.76 g of 17α-hydroxy-1,2;16-bismethylene-9β, 10α, -pregna-4,6-diene-3,20-dione was added to the hydrogenation mixture consisting of 1 g of palladium on calcium carbonate in 50 ml of toluene.

After the theoretic amount of hydrogen had been taken up, the reaction mixture was filtered, after which the solvent was distilled off at reduced pressure. The residue was crystallized from acetone, yielding 17α-hydroxy-1,2;16-bismethylene-9β, 10α-pregn-4-ene-3,20-dione.

c. 17α-hydroxy-1,2;16-bismethylene-9β, 10α-pregna-4,6-diene-3,20-dione 17-acetate A solution of 60 mg of 17α-hydroxy-1,2;16-bismethylene-9β, 10α-pregna-4,6-diene-3,20-dione and 60 mg of para-toluenesulfonic acid in 3 ml of acetic acid and 0.6 ml of acetic acid anhydride was stirred at 24°C for 2 hours and then poured in 20 ml of ice water. The mixture was extracted with three portions of 5 ml of dichloromethane each, and after 15 ml of n-hexane had been added to the extract the latter was successively washed with four portions of 15 ml water each and a 5 percent sodium bicarbonate solution unitl the washlayer was basic, and finally with water until the washlayer was neutral. The solution was dried over sodium sulfate, the solvent was distilled off at reduced pressure and the resulting residue was chromatographed over silicagel. After evaporation and crystallisation from a mixture of acetone and hexane (1 : 2) 17α-hydroxy-1,2;16-bismethylene-9β, 10α-pregna-4,6-diene-3,20-dione 17-acetate having a melting point of 228°–230°C was obtained.

d. 17α-hydroxy-1β2;16-bismethylene-9β, 10α-pregna-4-ene-3,20-dione 17-acetate 1.97 g of 17α-hydroxy-1,2;16-bismethylene-9β, 10α-pregna-4,6-diene-3,20-dione 17-acetate was added to a hydrogenation mixture consisting of 1 g of palladium on calcium carbonate in 50 ml of toluene. After the theoretic amount of hydrogen had been taken up, the reaction mixture was filtered and subsequently the solvent was distilled off at reduced pressure. The residue was crystallized from acetone, yielding 17α-hydroxy-1,2;16-bismethylene-9β, 10α-pregn-4-ene-3,20-dione 17-acetate.

e. 3,17α-dihydroxy-1,2;16-bismethylene-9β, 10α-pregna-3,5-diene-20-one 3,17-diacetate From a solution of 3.3 g of 17α-hydroxy-1,2;16-bismethylene-9β, 10α-pregn-4-ene-3,20-dione 17-acetate and 1.4 g para-toluenesulfonic acid in 200 ml of dry benzene 100 ml was distilled off with stirring. After 33 ml of isopropyl acetate had been added, 150 ml of benzene was distilled off by means of a fractionating column 25 cm long. The reaction mixture was cooled in ice to 10°C and poured in a mixture of 200 ml of ice water and 40 ml of pyridine. The organic layer was separated off and the water layer was extracted again with 50 ml of ether. The collected extracts were washed with five portions of 100 ml of water each. The solution was dried over sodium sulfate, the solvent was distilled off at reduced pressure and the resulting residue was crystallized from methanol. This yielded 3,17α-dihydroxy-1,2;16-bismethylene-9β, 10α-pregna-3,5diene-20-one 3,17-diacetate.

This compound was also obtained by dissolving 2.6g of 17α-hydroxy-1,2;16-bismethylene-9β, 10α-pregn-4-ene-3,20-dione in 60 ml of acetic acid anhydride and adding 2.6 g of paratoluenesulfonic acid. This mixture was stored at room temperature for 24 hours and then poured in a mixture of pyridine and water. The precipitate was filtered off and recrystallized from ethanol. This yielded pure 3,17α-dihydroxy-1,2;16-bismethylene-9β, 10α-pregna-3,5-diene-20-one 3,17-diacetate.

f. 6α(and 6β)-fluoro-17α-hydroxy-1,2;16-bismethylene-9β, 10α-pregn-4-ene-3,20-dione 17-acetate.

A solution of 7 g of 3,17α-dihydroxy-1,2;16-bismethylene-9β, 10α-pregna-3,5-diene-20-one 3,17-diacetate in 140 ml of dry acetone was added in a nitrogen atmosphere to a stirred solution of 3 g of dry potassium acetate in 85 ml of absolute ethanol. Perchlorylfluoride was passed through with stirring at a temperature between 0°C and 5°C for 4 hours. After gaseous nitrogen had then been passed through for 2 hours, the reaction mixture was filtered and the filtrate was poured in 1,500 ml of cold water.

After extraction with altogether 1 l of dichloromethane and 1 l petroleum ether (40°–65°C) the extracts were washed with water until a neutral washlayer was obtained. The solution was dried over sodium sulfate, filtered and concentrated by evaporation, the resulting residue being chromatographed over silicagel. This yielded:
6α-fluoro-17α-hydroxy-1,2;16-bismethylene-9β, 10α-pregn-4-ene-3,20-dione 17-acetate and 6β-fluoro-17β-hydroxy-1,2;16-bismethylene-9β, 10α-pregna-4-ene-3,20-dione 17-acetate.

20. Production of 6β-chloro-17α-hydroxy-1,2;16-bismethylene -9α10β-pregna-4-ene-3,20-dione 17-acetate A solution of 15 g of dry potassium acetate in 330 ml of glacial acetic acid and 55 ml of water was added to a solution of 8.2 g of 3,17α-dihydroxy-1,2; 16-bismethylene-9β, 10α-pregna-3,5-diene-20-one 3,17-diacetate in 130 ml of ether of −10°C. Immediately thereafter a solution of 1.49 g of chlorine in 37.2 ml of glacial acetic acid was added at −10°C in the course of about 10 minutes. After 30 minutes the reaction mixture was poured in ice water and then extracted with methylene chloride. The extract was successively washed with water, a 5 percent sodium bicarbonate solution and water, and then dried over sodium sulfate. After removal of the solvent by evaporation the residue was chromatographed over silicagel, and after crystallisation pure 6β-chloro-17α-hydroxy-1,2;16-bismethylene-9β, 10α-pregn-4-ene-3,20-dione 17-acetate was obtained.

21. Production of 3-ethoxy-6-fluoro-17α-hydroxy-1,2; 16-bismethylene-9β, 10α-pregna-3,5-diene-20-one 17-acetate.

A solution of 5.9 g of 6α(and 6β)-fluoro-17α-hydroxy-1,2;16-bismethylene-9β,10α-pregn-4-ene-3,20-dione 17-acetate and 1.45 g of paratoluene sulfonic acid in 115 ml of dry dioxan and 59 ml of ethylorthoformate was stirred in the dark at 20°C for 20 hours.

The crude reaction mixture was then poured in 1,500 ml of petroleum ether (40°–65°C) and 3 ml of pyridine, and this solution was filtered over silicagel. This yielded 3-ethoxy-6-fluoro-17α-hydroxy-1,2;16-methylene-9β, 10α-pregna-3,5-diene-20-one 17-acetate.

22. Production of 6-fluoro-17α-hydroxy-1,2;16-bismethylene-9β, 10α-pregna-4,6-diene-3,20-dione 17-acetate A reaction mixture of 3-ethoxy-6-fluoro-17α-hydroxy-1,2;16-bismethylene-9β, 10α-pregna-3,5-diene-20-one 17-acetate obtained in the same manner as described in Example 21 was poured, without working up, in a mixture of 29.5 g of manganese dioxide in 315 ml of acetic acid and 4.5 ml of water with stirring. After 30 minutes the mixture was filtered over filtering earth, and the filtrate was poured in 2 l of water. The mixture was extracted with methylene chloride and the extract was successively washed with water, a 5 percent sodium bicarbonate solution and water and then dried. After evaporation of the solvent the residue was chromatographed over silicagel and then crystallized from ethanol, yielding 6-fluoro-17α-hydroxy-1,2;16-bismethylene-9β, 10α-pregna-4,6-diene-3,20-dione 17-acetate.

23. Production of 3-ethoxy-6-chloro-17α-hydroxy-1,2;16-bismethylene-9β, 10α-pregna-3,5-diene-20-one 17-acetate A solution of 7.9 g of 6β-chloro-17α-hydroxy-1,2;16-bismethylene-9β, 10α-pregn-4-ene-3,20-dione 17-acetate and 300 mg of paratoluenesulfonic acid in 150 ml of dry dioxan and 7.5 ml of ethylorthoformate was stirred in the dark in a nitrogen atmosphere at 20°C for 18 hours.

The reaction mixture was then poured in 500 ml of petroleumether (40°–64°C) and 2 ml of pyridine, and this solution was filtered over silicagel. This yielded 3-ethoxy-6-chloro-17α-hydroxy-1,2;16-bismethylene-9β, 10α-pregna-3,5-diene-20-one 17-acetate.

24. Production of 6-chloro-17α-hydroxy-1,2;16-bismethylene-9β, 10α-pregna-4,6-diene-3,20-dione 17-acetate A crude reaction mixture of 3-ethoxy-6-chloro-17α-hydroxy 1,2;16-bismethylene-9β, 10α-pregna-3,5-diene-20-one 17-acetate was converted, in the same manner as described in Example 22, into 6-chloro-17α-hydroxy-1,2; 16-bismethylene-9β, 10α-pregna-4,6-diene-3,20-dione 17-acetate.

25. Production of 6-fluoro-17α-hydroxy-1,2;16-bismethylene-9β, 10α-pregna-4,6-diene-3,20-dione 17-caproate.

a. 6-fluoro-17α-hydroxy-1,2;16-bismethylene-9β, 10α-pregna-4,6-diene-3,20-dione 1.2 g of 6-fluoro-17α-hydroxy-1,2;16-bismethylene-9β, 10α-pregna-4,6-diene-3,20-dione 17-acetate was added to a solution of 1.1 g of sodium perchlorate in 110 ml of 0.5 N sodiumhydroxidemethanol. The mixture was stirred at room temperature in a nitrogen atmosphere for 3 hours and then poured in water and subsequently extracted with methylene chloride. The extract was washed with water and dried over sodium sulfate, then the solvent was removed by evaporation and the residue was chromato-graphed over silicagel. This yielded 6-fluoro-17α-hydroxy-1,2;16-bismethylene-9β, 10α-pregna-4,6-diene-3,20-dione.

b.     6-fluoro-17α-hydroxy-1,2;16-bismethylene-9β, 10α-pregna-4,6-diene-3,20-dione 17-caproate A solution of 215 mg of 6-fluoro-17α-hydroxy-1,2; 16-bismethylene-9β, 10α-pregna-4,6-diene-3,20-dione in a mixture of 7.4 g of caproic acid and 2 ml of trifluoroacetic acid anhydride was heated at 60°C in a nitrogen atmosphere for 1 hour.

After dilution with water the solution was extracted with ether, and the extract was successively washed with water, cold 1N sodium hydroxide solution and water. After drying over sodium sulfate the solvent was removed by evaporation and the residue was chromatographed over silicagel, yielding 6-fluoro-17α-hydroxy-1,2;16-bismethylene-9β, 10α-pregna-4,6-diene-3,20-dione 17-caproate.

26. Production of 6-fluoro-17α-hydroxy-1,2;16 -bismethylene-9β10α-pregna-4,6-diene-3,20-dione 17-propionate In the same manner as described in Example 25, 215 mg of 6-fluoro-17α-hydroxy-1,2;16-bismethylene-9β, 10α-pregna-4,6-diene-3,20-dione was reacted with 4.7 g of propionic acid and 2 ml of trifluoroacetic acid anhydride, yielding 6-fluoro-17α-hydroxy-1,2;16-bismethylene-9β, 10α-pregn-4,6-diene-3,20-dione 17-propionate.

27. Production of 6-chloro-17α-hydroxy-1,2;16 -bismethylene-9β,  10α-pregna-4,6-diene-3,20-dione 17-caproate In the same manner as described in Example 25, the above compound was produced by esterification of 6-chloro-17α-hydroxy-1,2;16-bismethylene-9β, 10α-pregna-4,6-diene-3,20-dione.

28.     Production     of 6-chloro-17α-hydroxy-1,2;16-bismethylene-9β, 10α-pregna-4,6 -diene-3,20-dione 17-propionate Similarly to the method described in Example 26 the above substance was produced by esterification of 6-chloro-17α-hydroxy    1,2;16-bismethylene-9β, 10α-pregna-4,6-diene-3,20-dione with propionic acid and trifluoroacetic acid anhydride.

29. Production of pharmaceutical preparations

By mixing the finely divided active substance (or substances) with a solid carrier material and adjuvants, tablets and dragees of the following compositions have been prepared.

a. Tablet:

| | |
|---|---|
| active substance according to the invention, such as 6-chloro-(or     6-fluoro-)16-methylene-17α-hydroxy-9β,10α-pregna-4,6-diene-3,20-dione 17-acetate | 0.02 mg |
| ethinyl estradiol | 0.05 mg |
| lactose | 56.2 mg |
| powdered sugar | 30.0 mg |
| potato starch | 6.0 mg |
| talc | 6.7 mg |
| magnesium stearate | 1.0 mg |
| Total weight | 100.0 mg |

Diameter of a tablet: 6.3 mm.

b. Tablet:

| | |
|---|---|
| active substance according to the invention, for example, the aforementioned one 0.002 mg lactose | 25.0 mg |
| maize starch | 6.0 mg |
| microcrystalline cellulose | 6.0 mg |
| talc | 2.5 mg |
| magnesium stearate | 0.5 mg |
| Total weight: | 40 mg |

Diameter of a tablet: 4 mm.

c. Dragee

| | |
|---|---|
| Core: a substance according to the invention, for example the above-mentioned one: | 0.01 mg |
| mestranol | 0.08 mg |
| lactose | 35.0 mg |
| saccharose | 15.0 mg |
| maize starch | 5.0 mg |
| talc | 3.9 mg |
| magnesium stearate | 1.0 mg |
| Total core weight | 60.0 mg |
| Coating: | |
| talc | 18.0 mg |
| saccharose | 71.2 mg |
| potato starch | 0.2 mg |
| gelatin | 0.3 mg |
| gum arabic | 0.3 mg |
| carnauba wax | 0.02 mg |
| shellac wax | 0.02 mg |
| dammar resin | 0.03 mg |
| Total coating weight | 90.0 mg |

Weight of a dragee: 150 . 0 mg.

What is claimed is:

1. Compounds of the general formula

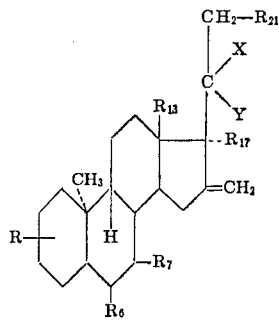

where

R is a 3-keto-4-dehydro,
  1,2-methylene-3-keto-dehydro,
  3-keto-1,4-bisdehydro,
  3-keto-4,6-bisdehydro,
  1,2-methylene-3-keto-4,6-bisdehydro,
  3-keto-1,4,6-trisdehydro,
  3OR-4,6-bisdehydro,
  1,2-methylene-3-OR-4,6-bisdehydro,
  3-OR-3,5-bisdehydro,
  1,2-methylene-3-OR-3,5-bisdehydro or
  3-OR'-1,4,6-trisdehydro group, where OR represents an etherified or esterified hydroxy group and OR' represents an esterified hydroxy group, $R_6$ is a hydrogen atom, a chlorine atom, a fluorine atom, a 6,6-difluoro group, a 6,6-dichlorogroup or a methyl group, whilst, if $R_6$ is a hydrogen atom, $R_7$ is a 6,7-methylene group, $R_7$ is a hydrogen atom or a 6,7-methylene group, whilst, if $R_7$ is a 6,7-methylene group, $R_6$ represents a hydrogen atom, a chlorine atom or a fluorine atom and also $R_3$ is a 3-keto-4-dehydro or a 3-keto-1,4-bisdehydro group, $R_{17}$ is an etherified hydroxy group containing from one to five carbon atoms or an esterified hydroxy group containing from one to seven carbon atoms, $R_{21}$ is a hydrogen atom, a fluorine atom, a hydroxy group or an esterified hydroxy group, $R_{13}$ is a methyl or ethyl group, and X and Y either together represent a double-bonded oxygen atom or X is a hydrogen atom and Y is a hydroxy or esterified hydroxy group.

2. Compounds as claimed in claim 1 of the general formula

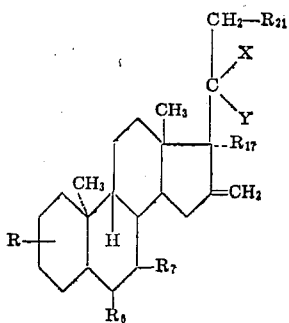

where R, $R_6$, $R_7$, $R_{17}$, $R_{21}$, X and Y have the meanings given in claim 1.

3. Compounds as claimed in claim 2 of the general formula

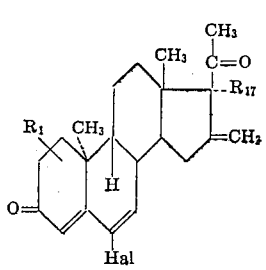

where R' is a hydrogen atom or a 1,2-methylene group,

Hal represents a chlorine or fluorine atom and $R_{17}$ has the meaning given in claim 2.

4. As a compound of claim 3, 6-fluoro-16-methylene-17α-hydroxy -9β, 10α-pregna-4,6 -diene-3,20-dione 17-acetate.

5. As a compound of claim 3, 6-fluoro-16-methylene-17α-hydroxy -9β, 10α-pregna-4,6-diene-3,20-dione 17-propionate.

6. As a compound of claim 3, 6-chloro-16-methylene-17α-hydroxy -9β, 10α-pregna-4,6-diene-3,20-dione 17-acetate.

7. As a compound of claim 3, 6-chloro-16-methylene-17α-hydroxy -9β, 10α-pregna-4,6-diene-3,20-dione 17-propionate.

8. As a compound of claim 3, 1,2; 16-bismethylene-6-chloro-17α-hydroxy-9β, 10α-pregna-4,6-diene-3,20-dione 17-acetate.

9. As a compound of claim 3, 1,2;16-bismethylene-6-chloro-17α-hydroxy-9β, 10α-pregna-4,6-diene-3,20-dione 17-propionate.

10. As a compound of claim 3, 1,2;16-bismethylene-6-fluoro-17α-hydroxy-9β, 10α-pregna-4,6-diene-3,20-dione 17-acetate.

11. As a compound of claim 3, 1,2;16-bismethylene-6-fluoro-17α-hydroxy-9β, 10α-pregna-4,6-diene-3,20-dione 17-propionate.

12. As a compound of claim 3, 6-chloro-16-methylene-17α-hydroxy -9β, 10α-pregna-4,6-diene-3,20-dione 17-caproate.

13. As a compound of claim 3, 6-fluoro-16-methylene-17α-hydroxy -9β, 10α-pregna-4,6-diene-3,20-dione 17-caproate.

14. As a compound of claim 3, 6-fluoro-16-methylene-17α-methoxy -9β, 10α-pregna-4,6-diene-3,20-dione.

15. As a compound of claim 3, 6-chloro-16-methylene-17α-methoxy-9β, 10α-pregna-4,6-diene-3,20-dione.

16. As a compound of claim 3, 1,2;16-bismethylene-6-fluoro-17α-methoxy-9β,10α-pregna-4,6-diene-3,20-dione.

17. As a compound of claim 3, 1,2;16-bismethylene-6-chloro-17α-methoxy-9β, 10α-pregna-4,6-diene-3,20-dione.

18. As a compound of claim 3, 1,2;16-bismethylene-6-chloro-17α-hydroxy-9β, 10α-pregna-4,6-diene-3,20-dione 17-caproate.

19. As a compound of claim 3, 1,2;16-bismethylene-6-fluoro-17α-hydroxy-9β, 10α-pregna-4,6-diene-3,20-dione 17-caproate.

* * * * *